United States Patent
Balon et al.

(10) Patent No.: US 9,773,074 B2
(45) Date of Patent: Sep. 26, 2017

(54) SYSTEM AND METHOD FOR BUILDING DIGITAL OBJECTS WITH BLOCKS

(71) Applicant: DAYBREAK GAME COMPANY LLC, San Diego, CA (US)

(72) Inventors: Paul Balon, Carlsbad, CA (US); Rosie Rappaport, San Diego, CA (US); Jeffrey Butler, Poway, CA (US)

(73) Assignee: Daybreak Game Company LLC, San Diego, CA (US)

( * ) Notice: Subject to any disclaimer, the term of this patent is extended or adjusted under 35 U.S.C. 154(b) by 965 days.

(21) Appl. No.: 14/094,716

(22) Filed: Dec. 2, 2013

(65) Prior Publication Data
US 2014/0163930 A1    Jun. 12, 2014

Related U.S. Application Data

(60) Provisional application No. 61/734,287, filed on Dec. 6, 2012.

(51) Int. Cl.
| | |
|---|---|
| *G06F 17/50* | (2006.01) |
| *A63F 13/40* | (2014.01) |
| *A63F 13/30* | (2014.01) |

(52) U.S. Cl.
CPC ............ *G06F 17/50* (2013.01); *A63F 13/10* (2013.01); *A63F 13/12* (2013.01); *G06F 2217/02* (2013.01)

(58) Field of Classification Search
CPC ...... G06F 17/50; G06F 2217/02; A63F 13/10; A63F 13/12
See application file for complete search history.

(56) References Cited

U.S. PATENT DOCUMENTS

| | | |
|---|---|---|
| 6,195,625 B1 | 2/2001 | Day et al. |
| 7,519,445 B2 | 4/2009 | Botvinnik et al. |
| 7,589,749 B1* | 9/2009 | De Laurentis ........ G06F 9/4443 345/676 |
| 8,257,157 B2 | 9/2012 | Polchin |
| 9,373,213 B1* | 6/2016 | Archer .................... G07F 17/32 |
| 2005/0219245 A1 | 10/2005 | Tao |
| 2010/0050083 A1* | 2/2010 | Axen .................... G11B 27/031 715/726 |
| 2012/0329556 A1* | 12/2012 | Eddy ....................... A63F 13/10 463/30 |

FOREIGN PATENT DOCUMENTS

CN       102298794 A    12/2011

OTHER PUBLICATIONS

Jason Van Gumster, "Blender for Dummies," 2011, Wiley, pp. 145-149.*

(Continued)

*Primary Examiner* — Kamini S Shah
*Assistant Examiner* — Russ Guill
(74) *Attorney, Agent, or Firm* — Lorenz & Kopf, LLP

(57) ABSTRACT

Systems and methods are provided for building digital objects using component modular objects, such as block objects. The block objects have properties defining their appearance and interaction characteristics. When two or more block objects are placed together to form an object, their interaction characteristics define how they behave and so how the computer system will handle the representation of the block objects and the new object.

42 Claims, 22 Drawing Sheets

(56) References Cited

OTHER PUBLICATIONS

Tim Laue et al., "SimRobot—A General Physical Robot Simulator and Its Application in RoboCup," 2006, in "RoboCup 2005," Springer-Verlag, pp. 173-183.*
Chris Wojtan et al., "Deforming meshes that split and merge," 2009, ACM Transactions on Graphics, vol. 28, No. 3, pp. 1-10.*
Adam Dawes, "Windows Mobile Game Development Building Games for Windows Phone and Other Mobile Devices," 2010, Springer, pp. 129-156.*
Author Unknown, Building Tools—Second Life Wiki, published May 25, 2011, 8 pages, downloaded from http://wiki.secondlife.com/wiki/Building_Tools.
Francis, "Crowd-sourcing game development The Unity Asset Store is changing how games are made" PC Jun. 2013, p. 16.

* cited by examiner

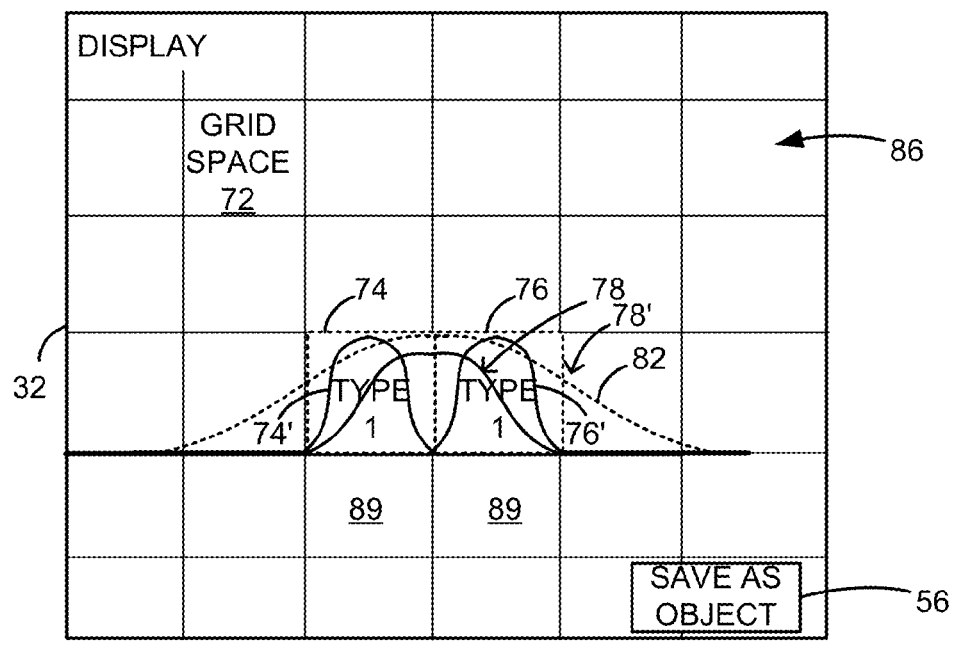
*FIG. 10*
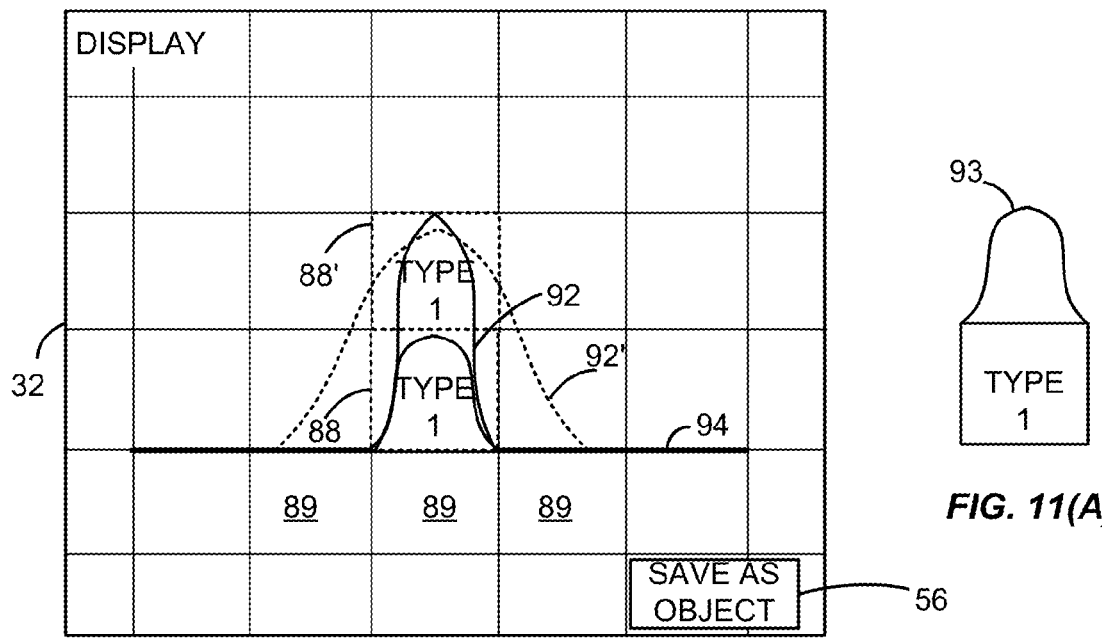
*FIG. 11*
*FIG. 11(A)*

SYSTEM AND METHOD FOR BUILDING DIGITAL OBJECTS WITH BLOCKS

CROSS-REFERENCE TO RELATED APPLICATIONS

This application claims benefit of priority of U.S. Provisional Patent Application Ser. No. 61/734,287, entitled "BUILDING DIGITAL OBJECTS WITH BLOCKS", which was filed Dec. 6, 2012, is owned by the assignee of the present application, and is herein incorporated by reference in its entirety.

FIELD OF THE INVENTION

This invention is in the field of digital simulations, and more particularly in the field of constructing digital objects for such simulations.

BACKGROUND OF THE INVENTION

Building objects from smaller pieces is a convenient way to create objects. This technique can be applied to building digital objects in computer systems as well. For example, in the game "Minecraft®", a user can create a custom digital object by stacking blocks one atop the other. However, when the component pieces are placed together, the combination may not be desirable because the pieces are simply attached. Beyond the grouping itself, no other benefits inure and in fact such systems are often times disadvantageous as they may lack flexibility.

For example, referring to the prior art FIG. 1, a display 14 is illustrated with two types of block objects, a type I block 24 and a type II block 26. Another type II block 26' is illustrated, also adjacent type I block 24. The blocks 24 and 26 are adjacent to each other horizontally, while the blocks 24 and 26' are adjacent to each other vertically. The blocks may be selected and placed in various ways by the user.

FIG. 1 shows how these prior art blocks behave when selected and placed. They maintain their shape, size, character, and type, no matter where they are placed, and no matter what type of block (or other feature) is adjacent them. This type of system is generally easy to use and can result in a wide range of simple structures.

In another type of prior art building system, tilesets are employed which constitute a set of background elements having a common theme. Using such, which are often editable, users are enabled to create maps, levels, or the like. Exemplary games involving tile sets include Starcraft® and The Sims®.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

Systems and methods according to present principles allow users to construct custom digital objects, e.g., for use within an online environment or simulation such as a multiplayer game. The systems and methods are highly flexible and allow custom creation of digital objects in interesting ways. For example, the block objects need not maintain their initial shape, but rather can create varied and interesting geometries due to their interactions with each other.

In the disclosed systems and methods, block objects adjoining each other may, by virtue of their virtual material composition, interact in defined and interesting ways. For example, two block objects of metal next to each other may appear as one block object of metal having double the volume. In the same way, two block objects of sand may not appear as two separated block objects of sand but may "combine" and form a single block object (or lump) of sand having a shape dependent on the positions of the constituent block objects of sand. For example, a single large cone of sand may result, i.e., may be the resultant combined visual representation of the two constituent block objects, also termed "voxels", which is generally in accord with the viewer's experience of the physical properties of real sand. In one implementation, the single enlarged cone of sand may be bounded by grid spaces or grid volumes associated with each block object (the term "grid space" is used generally, with grid volumes referring to a specific 3D implementation). In a related implementation, a boundary volume may be defined within which the new visual representation is confined, and vertices associated with the boundary volume may have their locations modified in one, two, or three dimensions, resulting in a boundary volume smaller than the initial grid volume. The visual representation of block objects may then be defined within the boundary volume, i.e., having the boundary volume define their greatest dimensions. In yet another related implementation, the boundary volumes may be defined and then simply filled, the filled boundary volumes forming the visual representation of the block objects.

In yet a further implementation, adjacent block objects may combine and form a combined block object with a visual representation that extends or "spills" into adjacent grid spaces. For example, the single enlarged cone of sand noted above may extend not only over the two spaces of a regular grid pattern where the two original block objects of sand were located, but may even spill over into adjoining grid spaces.

In general, each block object of material (which can be of any arbitrary shape, not just rectangular solids) has a set of characteristics defined including visual, geometric, and physics representations. Interaction characteristics may be defined for each type of material vis-a-viz each other type of material. Different interaction characteristics may be defined for different aspects, e.g., for visual interactions, for geometric interactions, and for physical interactions. In some implementations, the set of characteristics may be summarized by a parameter "type".

In a construction method, block objects are placed where desired by a user. As each block object is placed, the defined characteristics, including interaction characteristics with adjoining neighbor blocks, are employed to update the visual representation of the combined block objects. When finished, the new object may be saved and employed in artwork, animations, games, and so on. The new object can also serve as a template for other objects.

Variations will be seen. For example, numerous types of block object materials or types may be modeled and employed. Exemplary block object materials may include rigid and non-rigid solids, liquids, gases, plasmas, and specific materials such as sand, water, fire, gas, cloth, metal, wood, rope, hair, light effects, and so on, and in particular materials encountered in online simulations and games. For convenience in this specification, block objects may be referred to where their type is in adjectival form, e.g., an "earth block object" rather than a "block object of type 'earth'". In some implementations, the visual representation is bounded by the grid spaces associated with the block objects. In others, the visual representation is not so bounded. While each block object may be the same size in the grid and may occupy one space in the grid, the visual representation can be freely-defined. For example, a block object can be a pole that when converted to a visual representation or rendered appears to be much taller than the height of a single block object in the grid. Collision detection may be based on either the grid space or the visual representation, although use of the visual representation generally leads to results more consistent with user expectations. Depending on the physics allowed by the online environment, block objects may be allowed and configured to undergo phase transitions, e.g., from solid to liquid or from rigid solid to non-rigid solid. Numerous other such transitions will be understood to one of ordinary skill in the art given this teaching.

The systems and methods disclosed are primarily in the field of digital building for multiplayer games, but the same may be expanded to non-gaming fields, e.g., the creation of digital objects for any sort of purposes, e.g., artwork for CG objects for images and videos, artwork for social networking sites, shopping, or the like.

In one aspect, the invention is directed towards a method for creating digital objects, including: receiving a selection of a subject block object having a subject type; receiving a selection of a location in which to place the subject block object, the location defining a first grid space within a grid, the grid space at least partially surrounded with one or more neighboring block objects, each associated with a type; defining a combined visual representation of the subject block object based on the subject type and on the neighboring block objects and their respective types; anddisplaying the combined visual representation of the subject block object at the selected location.

Implementations of the invention may include one or more of the following. The method may further include displaying a visual representation of the one or more neighboring block objects. At least one of the neighboring block objects may have a type "air", and at least one of the neighboring block objects may have a type "rigid solid". Each grid space may represent a grid volume, each grid volume having the shape of a rectangular solid, and the grid may represent a three-dimensional space, and the number of neighboring block objects may equal twenty-six. The defining a combined visual representation for the subject block object may include retrieving a combined visual representation from a lookup table, the retrieving based on the subject block object type and on the neighboring block objects and their respective types. The defining a combined visual representation for the subject block object may include calculating a combined visual representation using an algorithm, the algorithm including parameters based on the subject type and on the neighboring block objects and their respective types. The defining and displaying a combined visual representation of the subject block object may include: defining a boundary volume, the boundary volume based on the subject type and on the neighboring block objects and their respective types; and defining and displaying a combined visual representation for the subject block object, the visual representation bounded by the boundary volume. The defining a boundary volume may include defining a planar surface within the grid space and parallel to a face of the grid space associated with the selected location but translated a distance from the face, where the boundary volume equals the grid space minus a volume defined by an area of the planar surface times the translation distance, and a position of the defined planar surface may be based on the subject block object type and on the neighboring block objects and their respective types and positions. The defining a boundary volume may include defining a surface within the grid space associated with the selected location, where the boundary volume equals the grid space minus a volume defined by the surface, and where a position and orientation of the defined surface is based on the subject block object type and on the neighboring block objects and their respective types and positions. The defining a boundary volume may include defining a closed surface within the grid space associated with the selected location, where the boundary volume is the volume within the closed surface, and a position and orientation of the defined closed surface may be based on the subject block object type and on the neighboring block objects and their respective types and positions. The defining and displaying a combined visual representation of the subject block object, the combined visual representation bounded by the boundary volume, may include defining the combined visual representation to have the same shape and position as the boundary volume. If one of the neighboring block objects has a type 'rigid solid', and if the one neighboring block object shares a common wall with the subject block object, then the combined visual representation defined of the subject block object may be such that the subject block object at least extends over the common wall. A grid volume occupied by the subject block object may be associated with a set of eight vertices, each of the eight vertices surrounded by eight of the twenty-six neighboring block objects, and the defining a combined visual representation of the subject block object may include calculating a boundary volume for the subject block object, the boundary volume at least in part calculated by translating each of the eight vertices associated with the grid volume a translation distance based on the subject block object type and on the eight neighboring block objects and their respective types and positions the translation distance of at least one of the eight vertices may be zero, such as if one of the eight neighboring blocks has a type 'rigid solid'. The method may further include a step of blending textures associated with the subject block object with textures associated with at least one of the neighboring block objects. The method may further include basing collision detection of the subject block object on at least the combined visual representation. The subject block object type may be liquid, and the method may further include generating a block object of type liquid in a neighboring grid space, the neighboring grid space not already occupied by a solid block object. If two of the neighboring block objects share a common wall with the subject block object, and if the two have a type rigid solid, and if the subject block type is non-rigid solid, then the combined visual representation defined may be such that the subject block object at least extends over each common wall shared with the two neighboring block objects, and a portion of a remainder of the visual representation of the subject block object may be defined by a lookup table or an algorithm.

In another aspect, the invention is directed towards a non-transitory computer-readable medium, including instructions for causing a computing environment to perform the above method.

In yet another aspect, the invention is directed towards a method for creating digital objects, including: receiving a selection of a first block object having a first type, first visual model, and first interaction information; receiving a selection of a location in which to place the first block object in a first grid space within a grid; receiving a selection of a second block object having a second type, second visual model, and second interaction information; receiving a selection of a location in which to place the second block object in a second grid space within the grid; if the first and second block objects interact, determining a combined visual representation using the first and second types, first and second visual models, and first and second interaction information, the combined visual representation different than a simple combination of visual representations of the first and second block objects based on their respective first and second visual models; and rendering the combined visual representation using a processor or a graphical processing unit.

Implementations of the invention may include one or more of the following. The method may further include: receiving a create object command; and Creating a digital object based on the first block object and the second block object and the combined visual representation. The grid may be a uniform grid. The second grid space may be adjacent the first grid space, and such may be employed to determine that the first and second block objects interact. The second grid space may be not adjacent the first grid space, and the first interaction information and the second interaction information may be such that the first block object and the second block object interact by a long-range interaction. The method may further include creating an object mesh based on the combined visual representation or on the digital object. The first block object or the second block object may have a visual model having a shape of a rectangular solid. The interaction information may include one or more characteristics selected from the group consisting of: visual characteristics, geometric characteristics, and physics characteristics. The interaction information may include characteristics such as block object type or effect distance. The type may be selected from the group consisting of rigid or non-granular solids, liquids, gases, non-rigid or granular solids, fire, sand, water, gas, cloth, rope, hair, grass, light effects, or plasmas. The method may further include, following the placing of the first block object in a first grid space, rendering a visual representation of the first block object using the associated visual model of the first block object. The combined visual representation, or the digital object, may have a different shape than a simple combination of the visual representations of the first and second respective block objects. The space occupied by a block object may be associated with a grid space. The grid may be a 3D grid, and each grid space may be a grid volume. The grid may be at least partially coextensive with a space in the online environment. The method may further include: receiving a selection of an effect block object; receiving a selection of a location in which to place the effect block object, the location occupied by a block object; determining a combined visual representation based on the block object and the effect block object; and rendering the combined visual representation. The first type may be the same as the second type, the location of the first block object may be adjacent the location of the second block object, and the combined visual representation may be of a single elongated block object rather than two separate block objects. The first type may be the same as the second type and the type may be a non-rigid solid, liquid, or gas, and the location of the first block object may be at a first grid space and the location of the second block object may be at a second grid space, the first grid space adjacent the second grid space, and the combined visual representation may be of a single elongated block object of a non-rigid solid, liquid, or gas, respectively, extending into at least one grid space adjacent the first or second grid space. The method may further include altering the first or second visual models, or both, based on the first and second interaction information. The method may further include creating a new visual model based on the first and second block objects or their respective visual models.

In another aspect, the invention is directed towards a non-transitory computer-readable medium, including instructions for causing a computing environment to perform the above method.

In yet another aspect, the invention is directed towards an object creation tool and interface, including: a block object type selection module running on a processor and configured to accept input about a type of block object to be placed; a block object positioning module running on a processor and configured to accept input about a location in which to place a block object having the selected type; an interaction module running on a processor and configured to determine an interaction between two placed block objects, the placed block objects having selected respective locations and types; and a visual representation module running on a processor and configured to render a display of a combined visual representation of the two block objects having a finite interaction, the rendered display different from a display of the at least two block objects in the absence of a finite interaction.

Implementations of the invention may include one or more of the following. Each block object may have an associated visual model, and the tool may further include a combined visual model module configured to create a new visual model based on the at least two block objects having a finite interaction, the combined visual model different from a simple combination of visual models associated with each block object.

Advantages of the invention may include one or more of the following. Block objects may be used to create digital objects, and the block objects may have synergistic or interactive effects when placed next to each other. Block objects may be created whose visual representations are unable to be obtained otherwise. Visual representations of block objects may be conveniently created "on-the-fly", negating the need to store large amounts of data. In other words, entities such as the visual mesh, the collision mesh, and the like, may be recalculated all on-the-fly.

Other advantages will be apparent to one of ordinary skill in the art, given the description that follows, including the claims and figures.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 10 is a depiction of an exemplary combined visual representation of two block objects according to present principles.

FIG. 11 is a depiction of another exemplary combined visual representation of two block objects according to present principles. FIG. 11(A) shows a specific implementation of the method of FIG. 11.

Corresponding reference characters indicate corresponding parts throughout the drawings. Elements are not drawn to scale unless otherwise indicated.

DETAILED DESCRIPTION

Figure 1:
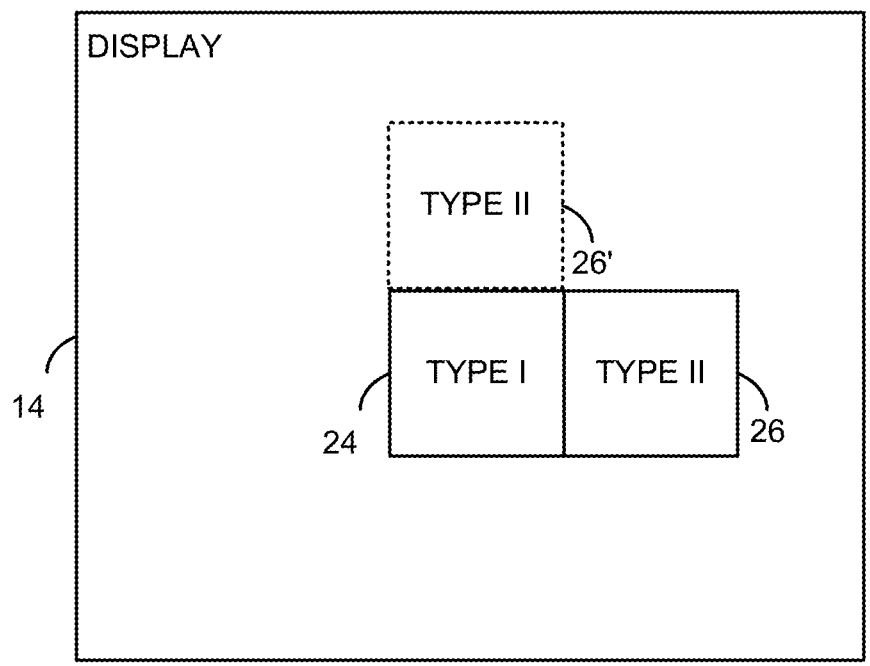
FIG. 1 is a schematic depiction of a prior art method of creating a digital object using blocks.

In systems and methods according to present principles, digital objects are built using component modular objects, which are block objects or "voxels". The spatial representations of the block objects are not necessarily rectangular solids, cubes, or any other particular shape, but are portrayed as cubes in this specification as a particular embodiment. The block objects have properties defining their appearance and interaction characteristics. For example, each block object has a type or set of characteristics defining how to represent the block object in the computer system, such as for visual, geometric, and physics representations, and how the block object interacts with other block objects. When two or more block objects are placed together to form a digital object or assembly, their interaction characteristics define how they behave and so how the computer system will handle the combined visual representation of the assembly of block objects.

In one implementation, the system and method generate a visual representation of elements in an online environment that is not constrained strictly to the visual grid that the environment is represented on. In addition, implementations according to present principles generally do not simply pull and place rigid shapes, but rather also take into account the data of disparate materials and how they interact with each other.

Various terms used in the specification are defined below.

A "block object" corresponds to a construct within a database, including data required to represent, manipulate, render, and otherwise interact with a block. In many cases block objects have a "block type" that indicates what the block object represents, or its constituent material (s), e.g., sand, metal, liquid, gas, and so on. Generally, a grid of grid spaces may have at most one block object per grid space, although certain exceptions are discussed below. For example, an "effect block object" may be employed, which shares a grid space with another block object, and causes an effect on the block object, the effect potentially altering the block object's visual representation, visual model, interaction characteristics, and so on. A "block object" is also occasionally termed a "voxel" in this specification.

A "visual model" or just "model" of a block object is a CG model corresponding to the block object. Texturing and rendering are performed on the visual model of the block object in order for the same to be displayed. A visual model includes one or more vertex points that define parts of the extent of the block object in space. In certain implementations described herein, the vertex points define parts of the extent of the block object in a grid, where the vertex points may be coincident with or be defined relative to points on the grid.

A "visual representation" corresponds to a rendered model or rendered "visual model". The visual representation of a single isolated block object is its appearance when rendered for viewing by itself. In some implementations, "rendered for viewing by itself" or the like may refer to the visual representation of a single block object surrounded by nothing or, e.g., a vacuum. In another implementation, the same may be referred to the visual representation of a single block object surrounded by block objects constituted of air or a gas or other materials which do not bear on movement of vertices associated with the block object. The visual representation of an assembly of block objects is their appearance when rendered for viewing, taking account of the type of the subject block object and the type and position of neighboring block objects, and/or their interaction characteristics, and is termed a "combined visual representation". Each block object can have a default visual model, e.g., shape, color and texture sets, to be used when the block object is placed by itself. The block object can have alternate visual models for different situations depending on the positions of other block objects. The block object can also have rules to dynamically adjust its model depending on other block objects. It is noted that, in another implementation, a new visual model based on a collection of block objects may be employed in creating a visual representation, rather than by combining visual models of member block objects. The visual representation represents a joint effect of all the block objects represented, including the effects block objects may have on each other due to interaction characteristics.

In some cases the visual representation of a block object surrounded by other block objects is defined by a "boundary volume". The boundary volume may be defined by the surrounding block objects, and the subject block volume may be defined so as to fit in the boundary volume. The shape of the subject block volume, i.e., its visual representation, may be defined by a lookup table, algorithm, or other means. In the case of a lookup table, a set of indices may be created by referencing the surrounding block objects, and the set of indices may be used to find an entry in the lookup table, where the entry is a corresponding visual representation for the subject block object. Pattern matching may similarly be employed. In another case, the indices may be employed in an algorithm to draw a curve associated with the combined visual representation desired. In yet another case, the indices may be employed to define the boundary volume, and/or the visual representation of the subject block object. In yet a further case, the indices or other information about surrounding block objects may be employed to create a boundary volume, and one or more points of the boundary volume may be employed to draw a curve associated with the visual representation of the subject block object.

The "type" of a block object indicates certain characteristics and properties about the block object, both with respect to the block object itself and with respect to the block object's interactions with other block objects, the latter being termed "interaction characteristics", which comprise a set of characteristics detailing how the block object type interacts with other block object types. As will be described in greater detail below, block objects may generally interact by virtue of their location, e.g., being within a certain distance from each other, e.g., adjacent, or may interact because of a more long-range interaction force, e.g., by being within a certain predetermined distance (e.g., measured in grid spaces) from each other.

A "simple combination" of block objects, their visual models, or their visual representations, refers to a view of the block objects as if there were no interaction characteristics, i.e., as if their interaction characteristics were null or zero. In contrast, the "combined visual representation" of such elements takes account of finite, i.e., non-zero, interaction characteristics, e.g., due to adjacency or long-range interactions. A grouping of block objects is sometimes referred to as an "assembly" of the same.

Figure 2:
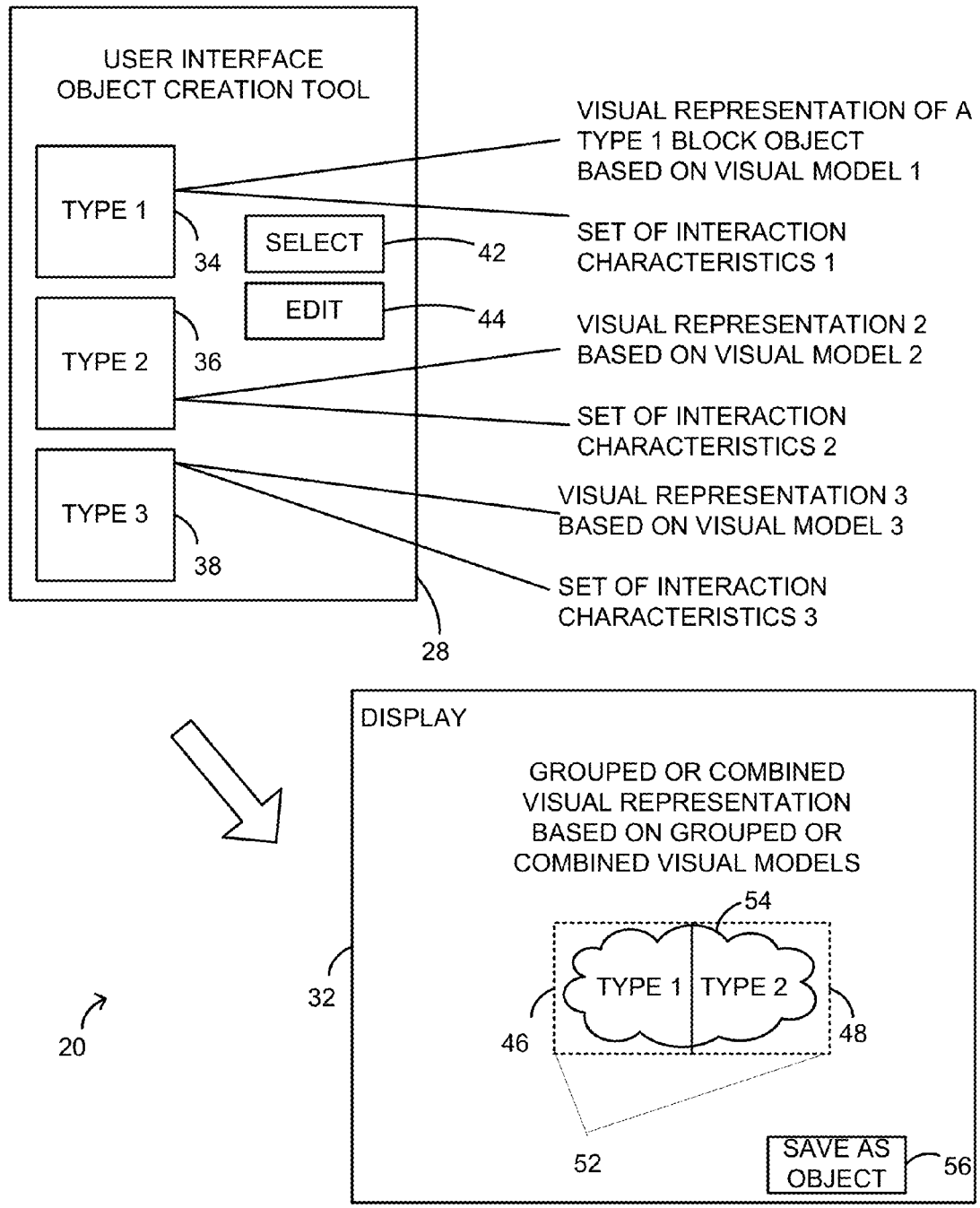
FIG. 2 is a schematic depiction of a system and method for creating a digital object having a combined visual representation according to present principles.

Referring to FIG. 2, a system 20 is illustrated in which an object creation tool and interface 28 is depicted where a user can create, select, modify, and place block objects to build digital objects. The digital objects can then be used in a game or simulation. In one implementation, the tool defines a uniform three-dimensional grid, where each block object fills one space in the grid. The user can then select block objects, e.g., by type, e.g., by activating a type I block indicator button 34, a type II block indicator button 36, a type III block indicator button 38, and so on. The user may edit already-placed block objects by selecting an edit button 44. The edit button may be employed to bring up a menu to edit already-placed block objects, e.g., their location, type, or other characteristics, or the edit button may also be employed to edit the user interface of the object creation tool 20, e.g., by making other types of block objects available for selection, or the like.

A display 32 indicates an assembly of block objects. In particular, a type I block object 46 (dotted line) is depicted in a first grid space adjacent a type II block object 48 (dotted line) in a second grid space. A visual representation of a simple combination of block objects is indicated by a simple combination 52. The simple combination 52 is simply the visual representation of each individual block object, placed next to each other in the grid. However, because of the interaction characteristics, a grouped or the combined visual representation, which is based on the grouped or combined visual models of the grouped block objects, is not the same as the simple combination 52. Accordingly, the same is schematically illustrated as a combined visual representation 54 (solid line). In one implementation, as shown, the combined visual representation 54 is entirely contained within the grid spaces assigned to block objects 46 and 48. In other implementations, the combined visual representation may extend beyond such borders. In any case, the combined visual representation may then be the basis for creation of an object, textured, and employed for collision detection. In yet other implementations, the combined visual representation may be confined to the grid spaces associated with the constituent block objects, but may appear to extend beyond the grid spaces, e.g., for texture blending with adjacent block objects as will be described.

Using the object creation tool 28, a user may create, select, modify, and place block objects at locations or spaces in the grid. The tool displays to the user how the block objects will appear based on their characteristics and interaction. The user can then continue to edit the digital object by moving, adding, editing, or removing block objects and by changing the characteristics of block objects. When the user is finished, the user saves the configuration of block objects as an object or as an object template using a "SAVE AS OBJECT" button 56. The computer system processes the command and creates a new object or template compatible with the target system, such as a specified game. The object or template is now ready for use in the target environment.

Figure 3:
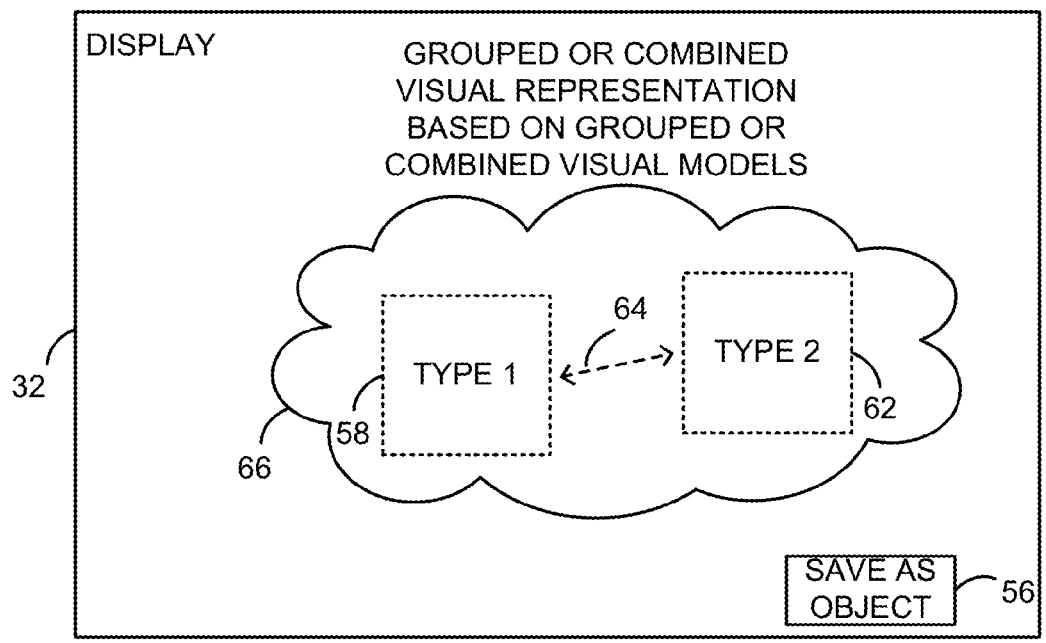
FIG. 3 is a schematic depiction of the system and method of FIG. 2, indicating a long-range interaction between non-adjacent block objects.

Referring to FIG. 3, a display 32 is shown in which a type I block object 58 is not adjacent a type II block object 62, but rather is separated from the same by a finite distance. In this situation, the interaction characteristics between the type I block object 58 and the type II block object 62 are such that a long-range interaction 64 takes place between them, altering the visual representation of their combination, from a simple combination (as simply shown by the two block objects themselves) to a combined visual representation 66 which is not the same as the simple combination. Examples of long-range interactions include those simulated to be caused by long-range forces, such as gravity or electromagnetism. For example, in a visual model of two planetary bodies, one with a liquid surface, gravitational forces from one body may cause the visual representation of the combination to show the effects of tides.

Figure 4:
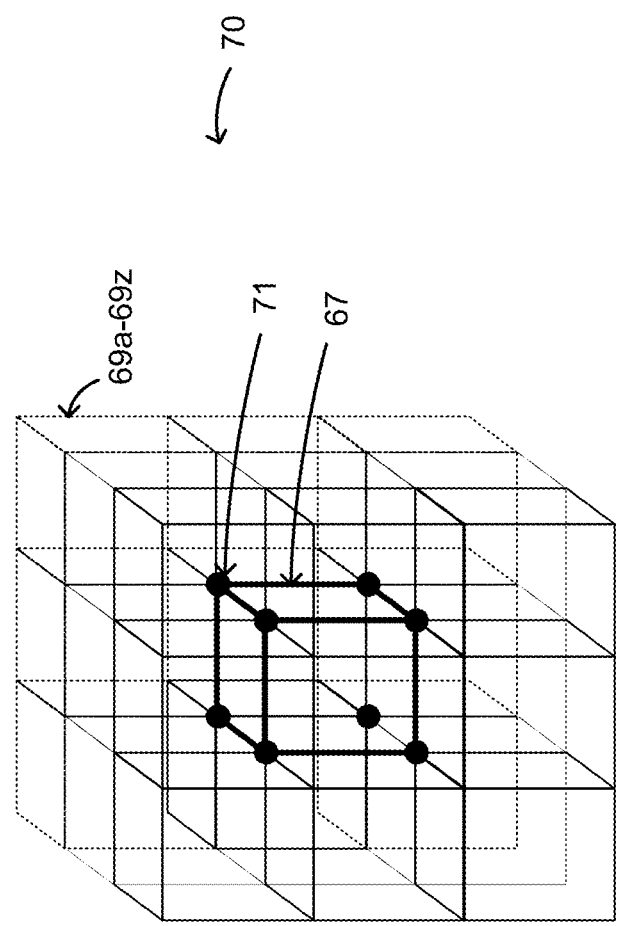
FIG. 4 is a depiction of a subject block object within a grid, as well as neighboring grid spaces, which are locations of potential neighbor block objects.

One way of implementing the present principles is shown in FIG. 4, which illustrates a more detailed depiction of a grid, and in particular a 3D grid 70. An exemplary block object 67 is illustrated within the grid 70. Various vertices or points 71 are also illustrated which are defined for the block object when placed in the grid space. For the 3-D grid and exemplary block object 67, and in particular where the block object is a rectangular virtual solid, eight vertices 71 are generally defined. For other shapes of block objects, and for non-Cartesian grids, it will be understood that the number of vertices may be different. In FIG. 4, the block object 67 is located in the center of the depicted grid spaces, and is completely surrounded by them. Thus, in this geometry, the block object 67 has six nearest-neighbor grid spaces with which it shares a face, twelve next-nearest-neighbors with which it shares an edge, and eight next-next-nearest-neighbors with which it shares a point, resulting in a total of twenty-six grid spaces or volumes 69a-69z surrounding the block object 67. Each vertex associated with the block object 67 has eight surrounding grid spaces that can potentially affect it. If the grid spaces were occupied by block objects, the block objects could interact with the subject block object 67, and each other, and have an effect on adjacent vertices, as discussed above and as further discussed below.

In some implementations, if the block object 67 is the first to be placed, it may be considered as having no block objects surrounding it or alternatively may be considered as being surrounded by "air" or "vacuum" block objects. In many cases, a first block object will be placed and then a second will be placed adjacent it. And in many of these cases, the first block object may be placed on a "ground" or "earth" surface, e.g., the surface under the subject block object 67, which is often a rigid solid block object, and the effect of block objects constituting the surface will immediately adjust the visual representation of the placed first block object.

Figure 5:
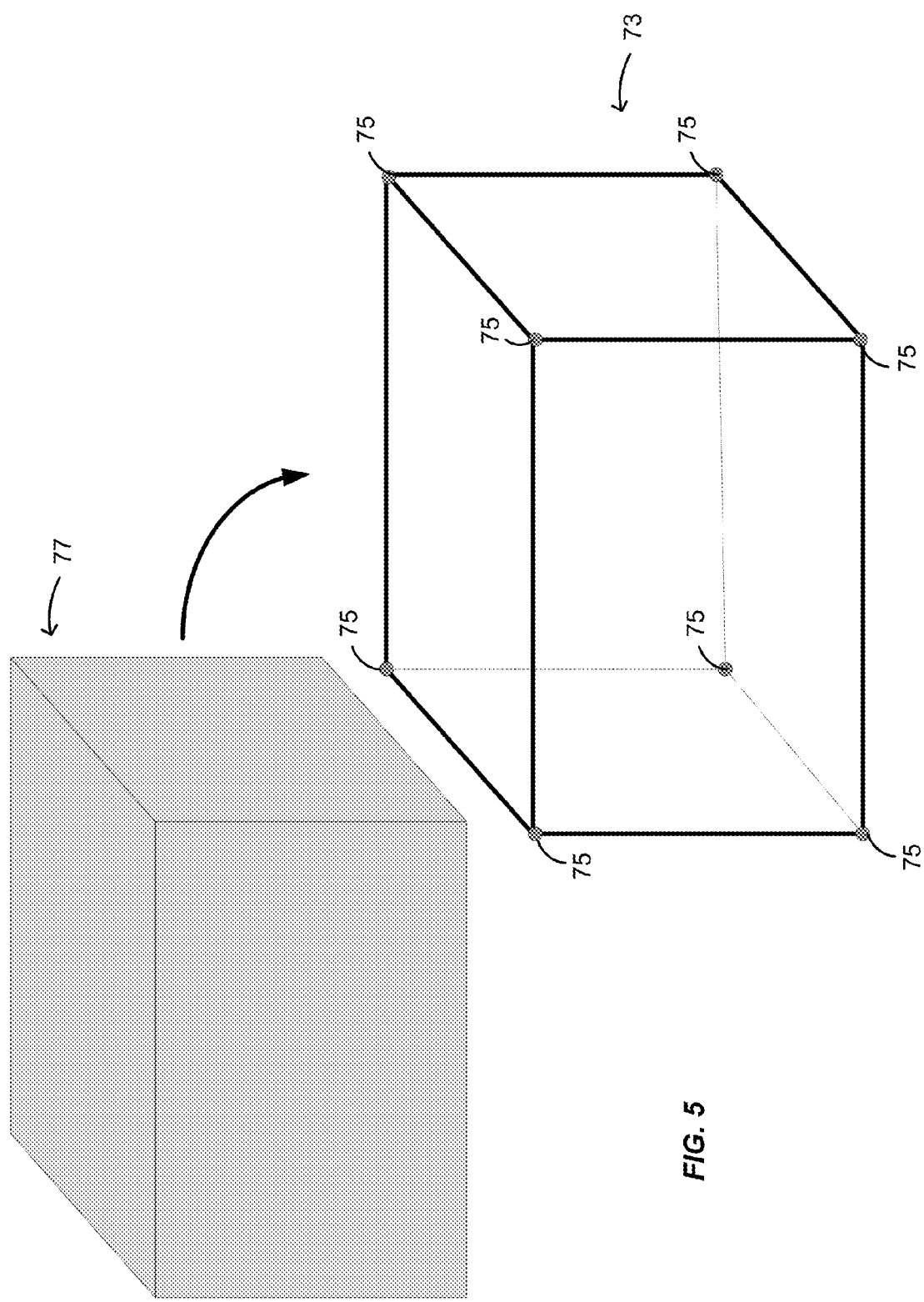
FIG. 5 is a depiction of a block object being placed into a grid space or volume.

Referring to FIG. 5, a particular grid space 73 is illustrated, which in this 3D implementation is a grid volume. Surrounding grid volumes and block objects are not shown for clarity.

The grid volume 73 may be generally surrounded by one or more block objects, even if the block objects are of generally non-interacting types such as air or vacuum. In other implementations, surrounding grid volumes may be considered empty. The grid volume 73 is associated with, in the 3-D environment of FIG. 5, eight vertices 75.

In systems and methods according to present principles, a block object or voxel 77 may then be associated with the grid space or volume, e.g., by being dragged thereto or via other means, e.g., having location coordinates associated with a block type. As in FIG. 2, a block type may be illustrated on the menu, and by dragging a block type to the location of the grid space, a block object having that type populates the grid space. As shown, prior to placement in the grid space 73, the block object 77 may have the shape of a rectangular solid or other such shape.

Once the block object 77 is placed in the grid space 73, the visual representation of the block object 77 may be modified in a way based on its block type, as well as on the position and types of surrounding block objects.

Figure 6:
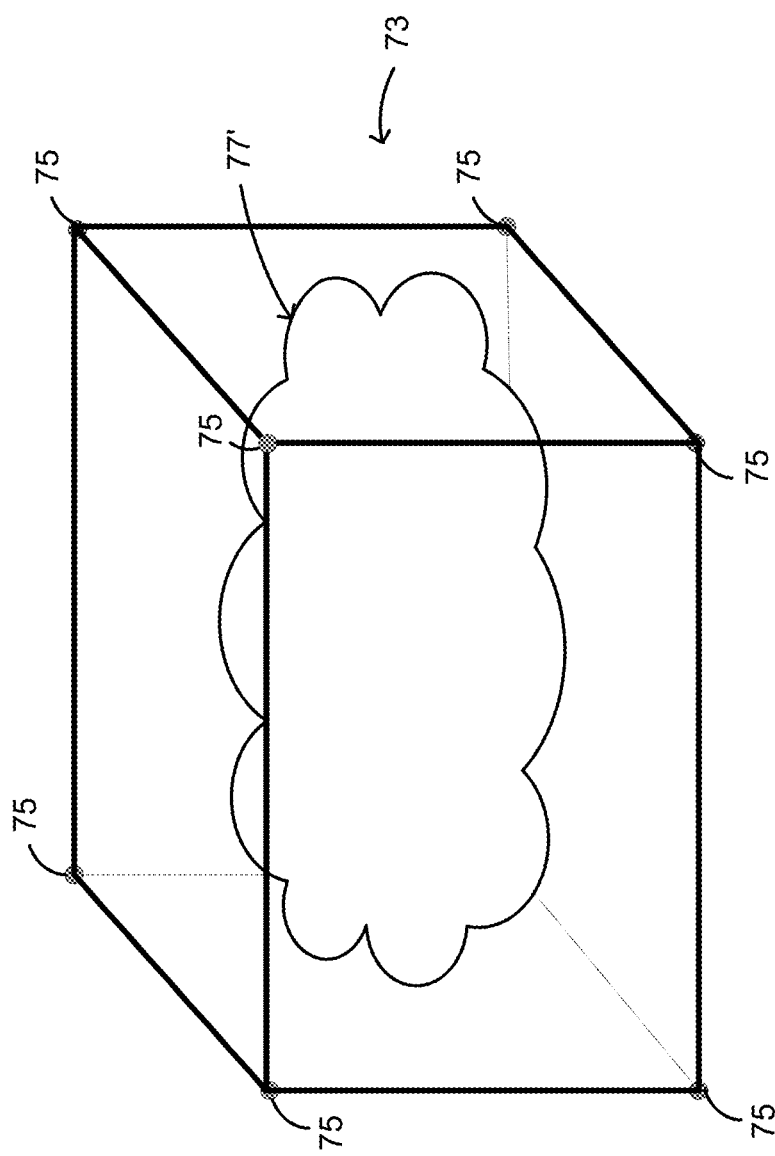
FIG. 6 is a general schematic depiction of a combined visual representation due to the modification of a visual representation of a subject block object due to its interaction with neighboring block objects.

For example, and referring to FIG. 6, a lookup table or algorithm may be employed to modify the visual representation of the block object 77 based on its block type and the position and types of surrounding block objects. In FIG. 6, such is illustrated by the modified visual representation 77'. For example, lookup tables or pattern recognition algorithms may be employed to determine or select a modified visual representation, given a particular set of surrounding block object types and positions, and given a particular type of subject block object. In one implementation, for a given type of subject block object, the myriad set of potential visual representations collapses into approximately twenty to thirty distinct representations, e.g., twenty-five to thirty distinct representations, due to inherent symmetries and other degeneracies that limit the number of distinct solutions.

Other limitations may cause further collapsing. For example, rigid solids such as stone may only have one visual representation, and all combinations are mapped into that one. Sand may have relatively few as well, as do many very soft materials. The greatest number of distinct visual representations may generally be found for materials of medium rigidity, such as earth. Other specific examples of modified visual representations are provided below.

Figure 7:
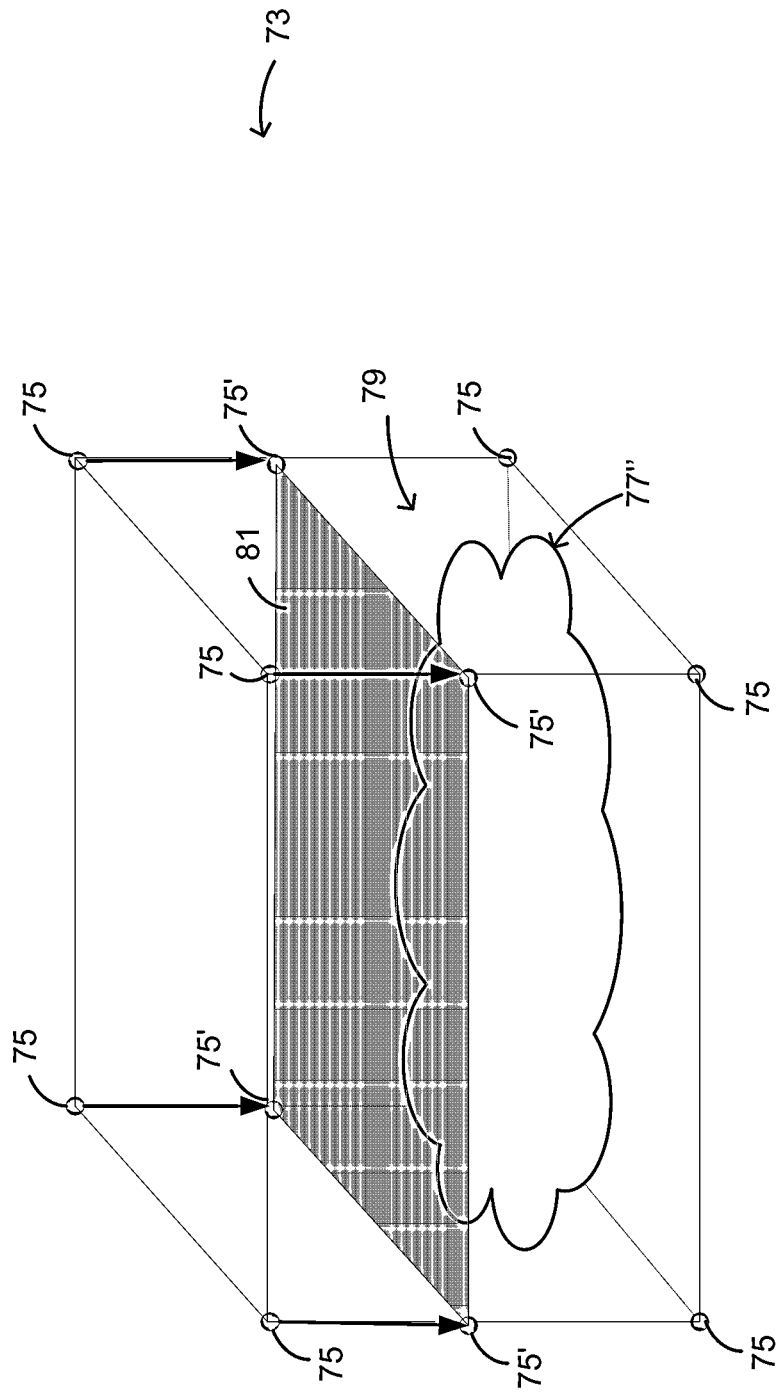
FIG. 7 illustrates generation of a boundary volume by translating vertices in one dimension by a translation distance.

In yet another implementation, as illustrated in FIG. 7, rather than have a modified visual representation based directly on the subject block object type and the position and type of surrounding block objects, the subject block object type and the position and type of surrounding block objects may be employed to calculate and create a boundary volume 79, within which the modified visual representation will be placed. The shape of the modified visual representation may still be based on any of the considerations described above, but may also be based on data about the boundary volume, e.g., its boundary vertices, its shape, and so on.

In FIG. 7, the boundary volume 79 is defined in part by of plane 81 created by translating the vertices 75 in one dimension, e.g., downward by a translation distance of about half the grid space in this example, resulting in boundary volume vertices 75'. The boundary volume is then the grid volume minus the translation distance times the area of the plane 81. In one specific implementation, if a grid space has a dimension of 1 meter on a side, the boundary volume of FIG. 7 would be approximately 1 m×1 m×0.5 m. The resulting modified visual representation 77" is then constrained fit within the boundary volume 79. Even this modified visual representation is termed a "combined visual representation" as the same is defined by the combination of the subject block object with its neighboring block objects. As noted elsewhere, however, in other representations, the modified visual representation may extend beyond the boundary volume definition.

Figure 8:
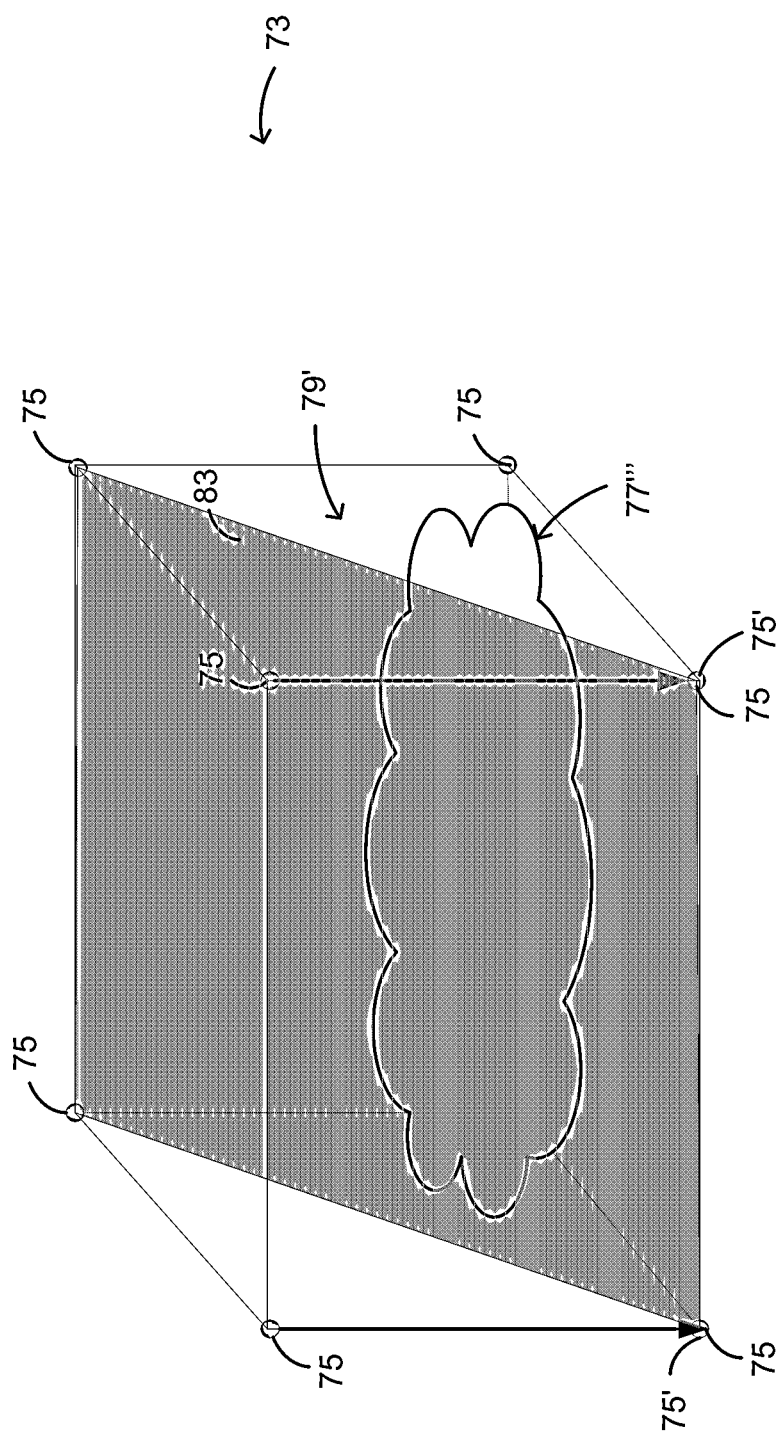
FIG. 8 is another illustration of generation of a boundary volume by translating vertices in one dimension by a translation distance.
Figure 9:
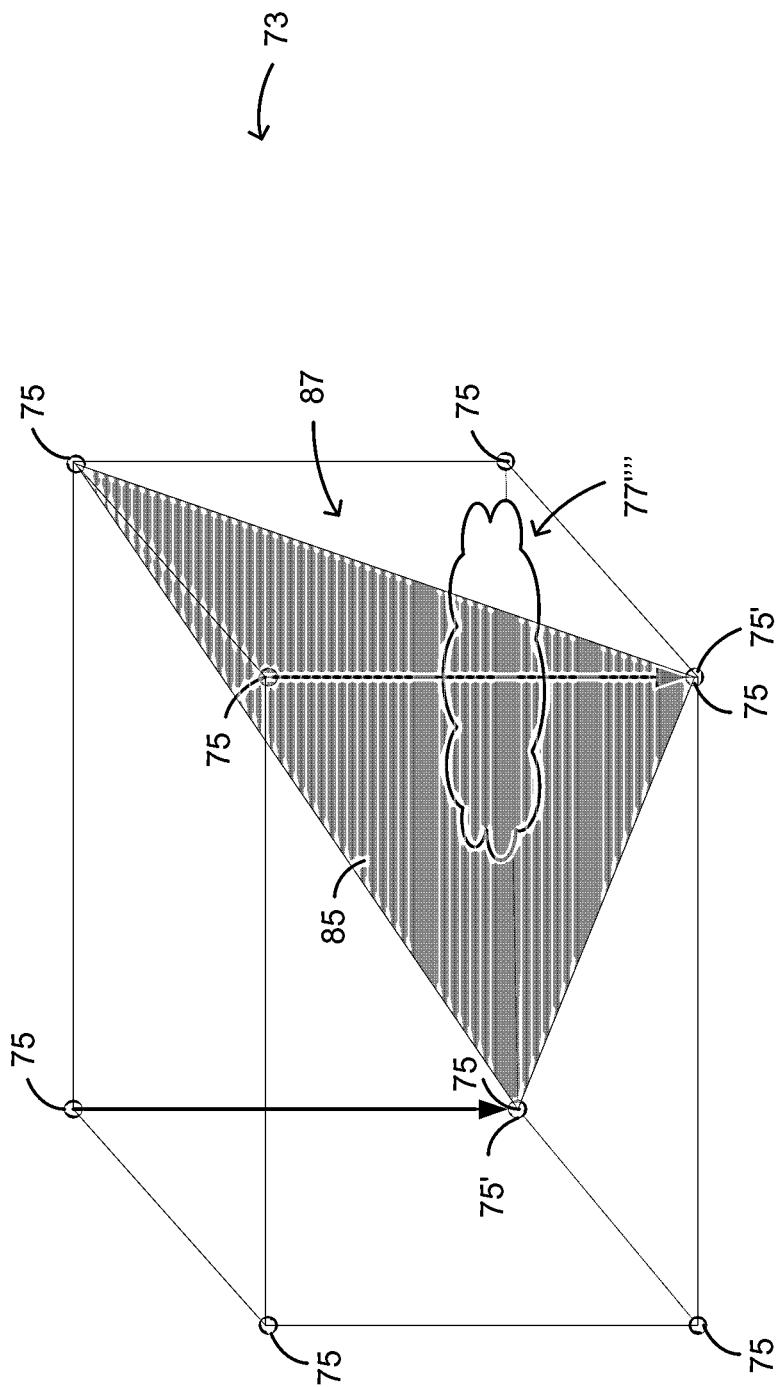
FIG. 9 is another illustration of boundary volume generation by translating vertices in one dimension by a translation distance.

Moreover, the boundary volume need not be always defined by a bounding plane that is parallel to one of the faces of the grid space. For example, FIG. 8 illustrates the situation when where two vertices 75 of the original top face are translated by translation distances to the locations indicated by vertices 75', and where two vertices 75 of the original top face are maintained in their original position. A boundary volume 79' is thus created which is a triangular solid having a bounding plane 83. The modified visual representation 77' is then confined within the bounding volume 79'. FIG. 9 illustrates a situation where a pyramidal boundary volume 87 is created with a bounding plane 85 where just one original boundary vertex 75 stays in the same position while others are translated by translation distances to new locations 75'. The modified visual representation 77"" is then confined within the bounding volume 87.

Having vertices 75 translate in just one dimension is generally sufficient to create a wide range of desired visual representations. Moreover, such may create a more intuitive and easy-to-understand user experience. However, it will be understood that in other implementations vertices 75 may be translated in more than one dimension to create more complex shapes.

In summary, where a block object is situated alone, with no adjacent block objects and with no block objects for which it may have a long-range interaction, the visual representation may be such that the original vertex points define the extremities of the block object. However, if there is an adjacent block object, or a block object with which a long-range interaction is present, or an effect block object is applied to the block object, then the visual representation of the block object may be modified and/or a boundary volume may be created within which a modified visual representation of the block object is placed. For example, in one implementation for rectangular virtual solids as block objects, the vertices may be un-translated, i.e., unmoved, on any faces of a given subject block object which are adjacent or touching faces of adjacent block objects. Another exemplary rule may be that vertices are un-translated where edges are touching adjacent block objects, or where points are touching, especially where at least one block object type of the touching point, edge, or face, is a rigid solid. Other exemplary rules, e.g., for curved block objects, may be that vertices are un-translated where the curved block objects touch or intersect, or where they touch or intersect for greater than a predetermined threshold percentage of their overall surface area (again, for 3D virtual solids). It will be understood that such rules may be extended for other shapes and other dimensionalities.

As particular examples, and referring to FIG. 10, two block objects 74 and 76 with a block type of granular or non-rigid solid, in this case "sand", are illustrated, along with a regular grid pattern 86 having exemplary grid space 72. The block objects 74 and 76 may be rendered individually as small piles of sand 74' and 76'. In FIG. 10, each is in the shape of a pile of sand and not a block of sand because each is adjacent, and in the case of FIG. 10 is situated above, a rigid solid block 89. That is, the visual representation of a block object of type "sand" is modified so as to create a small pile or hill of sand because the same is adjacent a block object of type "rigid solid". This effect is caused by, in this implementation, a rule that states that, for a non-rigid solid adjacent a rigid solid, a common face between the two must be entirely covered by the non-rigid solid. In FIG. 10, as the other neighboring block objects surrounding the non-rigid solid block objects 74 constitute "air" or "vacuum" or "empty" block objects, such do not have rules requiring contact by at least a portion of the non-rigid solid block object. Accordingly, vertices adjacent such block objects, constituting the visual representation of the block object, or alternatively vertices constituting a boundary volume bounding the visual representation of the block object, are free to move and can be defined or translated in a number of ways, e.g., as dictated by a lookup table, an algorithm defining a curve, or the like.

It is noted that the above-noted effect on non-rigid solids need not be an effect caused by a simulated gravitational force. Indeed, if the rigid solid block objects 89 were above the non-rigid solid block object 74, rather than below, the block objects 74 would not fall but would create a "tear" or "drop" hanging below the block objects 89. In the case where a rigid solid block object is both above and below a non-rigid solid block object, then the non-rigid solid block object would again take the shape of a cube, so as to accommodate the eight now-stationary vertices: four on the cube's top face, which shares a common wall with a rigid solid block object, and four on the cube's bottom face, which also shares a common wall with a rigid solid block object.

In the case of FIG. 10, the block objects are placed adjacent each other, in which case they may be rendered as a single pile of sand 78. In one implementation, the single pile of sand 78 may be entirely contained within the grid spaces assigned to the block objects 74 and 76, and in fact does not extend even to the top of the grid space, an effect which may be caused by a boundary volume being defined having a height which is shorter than the grid volume, i.e., which has vertices defining its height that have been moved a finite translation distance below the top of the grid volume.

One benefit to such implementations, where visual representations are entirely contained within the grid spaces associated with their corresponding block objects, is that there is no need to accommodate extra block object visual representations in adjoining or adjacent grid spaces, that may already be occupied by other block object visual representations.

In another implementation, also shown in FIG. 10, the block objects 74 and 76 may have a modified or combined visual representation 78' (dotted lines) that is defined to have edges 82 that extend into grid spaces not previously associated with the respective blocks. That is, the visual representation of block objects or groups of block objects is not necessarily limited to the grid spaces used for placing block objects. In such alternative implementations, while each block object may be the same size in the grid and may occupy one space in the grid, the visual representation can be freely defined. For example, a block object can be a pole that when rendered appears to be much taller than the height of a single block object in the grid.

FIG. 11 illustrates a situation where two block objects 88 and 88' are disposed vertically adjacent each other, i.e., one on top of the other. As with FIG. 10, the visual representation of the assembly of block objects may be such that they are rendered as a single larger pile of sand 92, within the boundaries of the grid spaces, or as a single larger pile of sand 92' (dotted lines) that extends outside of the grid spaces. Here again it is noted that a ground surface 94 with rigid solid block objects 89 is employed that causes the sand piles to lump as opposed to remaining cubes or rectangular solids. While gravitational effects may be implemented, it is noted that the creation of the single larger pile of sand as a visual representation comports with the user's experience of reality in a way consistent with gravity even without an explicit gravitational force definition.

While the visual representation 92 of FIG. 11 showed the case where even the bottom block object 88 had its sides pulled in from the corners (either by movement of vertices associated with the visual representation or by a change in the boundary volume) in order to create a pleasing visual transition with the pile-shaped visual representation of block 88' above it, such is not required. FIG. 11(A) illustrates a combined visual representation 93 in which a bottom block object is maintained a cube (or other rectangular solid) while the visual representation of the top block object is modified as above, i.e., to form a pile or lump as the same is only bounded on one face (by block object 88). Combined visual representation rules in this scenario may be simplified as compared to the creation of the visual representation 92 or 92', since a rule requiring that common walls be entirely covered by block objects of type nonrigid solids may be consistently applied. In this regard it is noted that, in visual representation 92 or 92', while each point on the common wall between block objects 88 and 88' has a corresponding contributing point from each block object, the common wall of points need not be co-extensive with the face of the corresponding grid space or volume.

Figure 12:
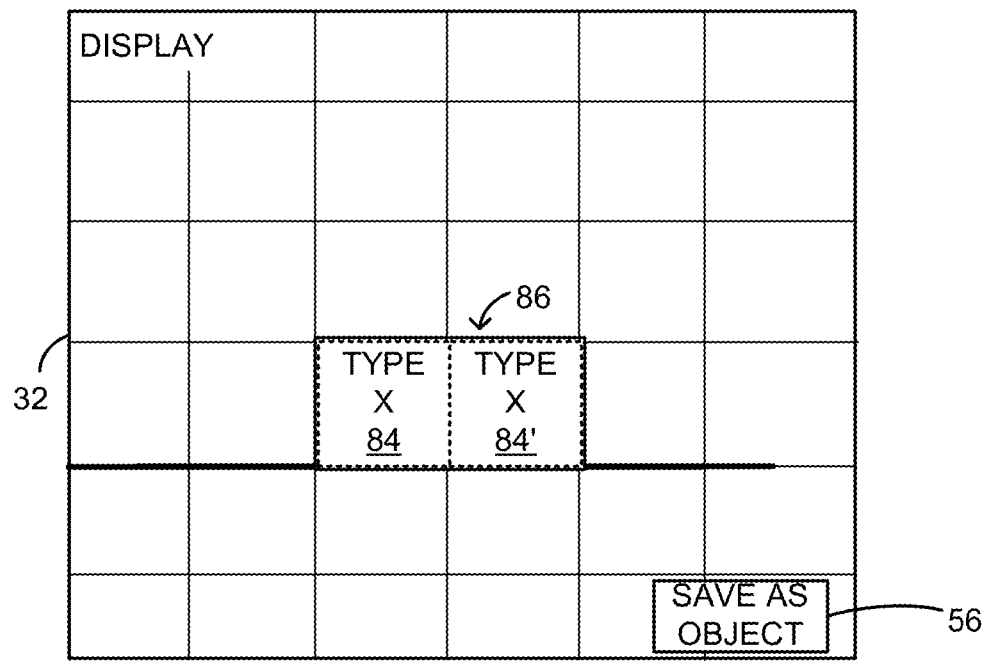
FIG. 12 is a depiction of yet another exemplary combined visual representation of two block objects according to present principles.

As another example, and referring to FIG. 12, two block objects 84 and 84' of type X, e.g., a rigid solid such as stone, may be rendered as two individual cubes of stone while separated, but rendered as a single oblong brick 86 having the same volume as the two cubes when the two block objects are adjacent. Visually, the brick would not appear to be made of two pieces.

Figure 13:
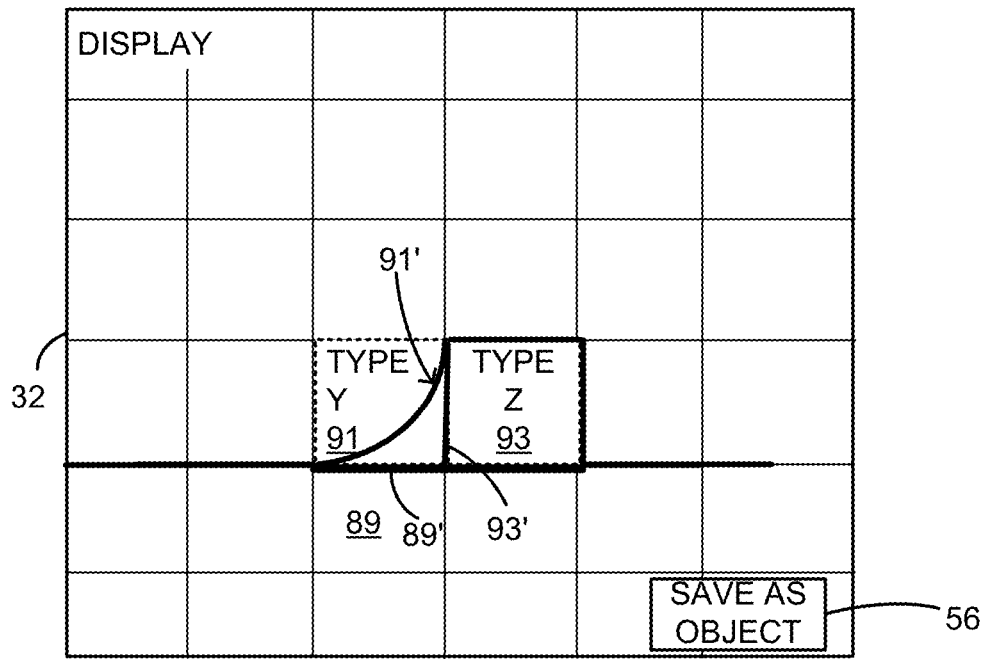
FIG. 13 is a depiction of an exemplary combined visual representation of three block objects according to present principles.

As another example, referring to FIG. 13, a block object 91 of type Y or "non-rigid solid" is adjacent a block object 93 of type Z or "rigid solid", and is also adjacent a ground block object 89 (which is also a rigid solid). A common wall between block object 91 and the ground block objects 89 is illustrated by wall 89', and a common wall between block object 91 and the rigid or solid block object 93 illustrated by common wall element 93'. The effect on the visual representation of non-rigid solid block object 91 is that the same may extend over the entirety of the common wall of each block object, with the shape of the remaining portion of the non-rigid solid, not contacting the common wall, defined by a lookup table, algorithm, or the like. An exemplary visual representation is shown by element 91'. While a particular curve shape is illustrated, it will be understood that the same may vary according to the intentions of the designer, e.g., logarithmic, exponential, or the like. It will also be understood that while a rule in the above-described implementation is that a non-rigid solid adjacent a rigid solid extends over the entirety of the common wall between the two, there is no requirement that such be the case. For example, the non-rigid solid may extend over only a portion or percentage of the common wall.

Generally, the effect of neighboring block objects on a subject block object of a given type is dictated by the type and position of the neighboring block objects. In some implementations a weighted average may be employed to determine the effect of neighboring block objects. In these or other implementations, certain constraints may be employed to simplify processing, such as the above-implemented rule that a non-rigid solid adjacent a rigid solid extends over the entirety of the common wall between them. In this case, a weighted average may be employed taking into account types of neighboring block objects where the block object type is non-rigid solids or, e.g., very thick or viscous liquids. However, no particular constraints need be employed. In addition, while the described implementations have utilized the type of a subject block object as well as the type and positions of twenty-six neighboring block objects, enhanced implementations may include considerations of neighboring block objects even farther away, although such considerations generally require exponentially more computational processing power.

Figure 14:
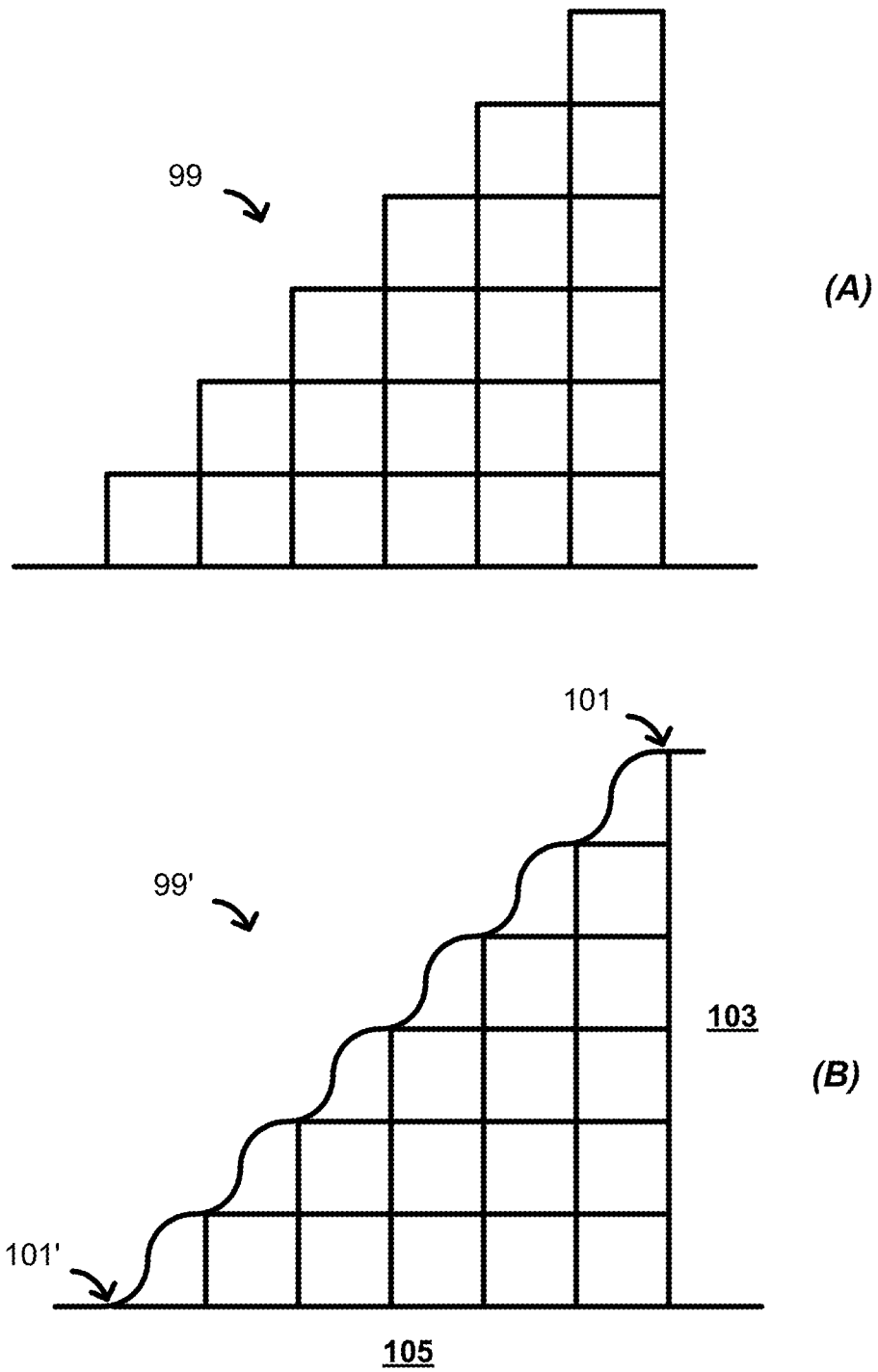
FIGS. 14(A) and 14(B) illustrate a combined visual representation of block objects in a "stairway" shape showing a process of averaging.

A combined visual representation implemented by an averaging step may be seen in simplified form in FIGS. 14(A) and 14(B). In FIG. 14(A), a set of block objects 99 is illustrated which is in the general shape of a stairway. FIG. 14(B) shows a visual representation of the set of block objects according to an implementation of present principles in which the hard edges of the block objects are maintained when the block objects are entirely surrounded by neighbors of similar (rigid) character, but are rounded or smoothed into the visual representation 99' where such form an interface with block objects of type "air" or the like. The combined visual representation may be thought of as the effect of averaging or smoothing the rigid block objects with the air block objects. The terminus points, e.g., point 101 and point 101', maintain their positions and are not moved, as such are in contact with rigid blocks indicated by the wall 103 and the ground 105, respectively.

Figure 15:
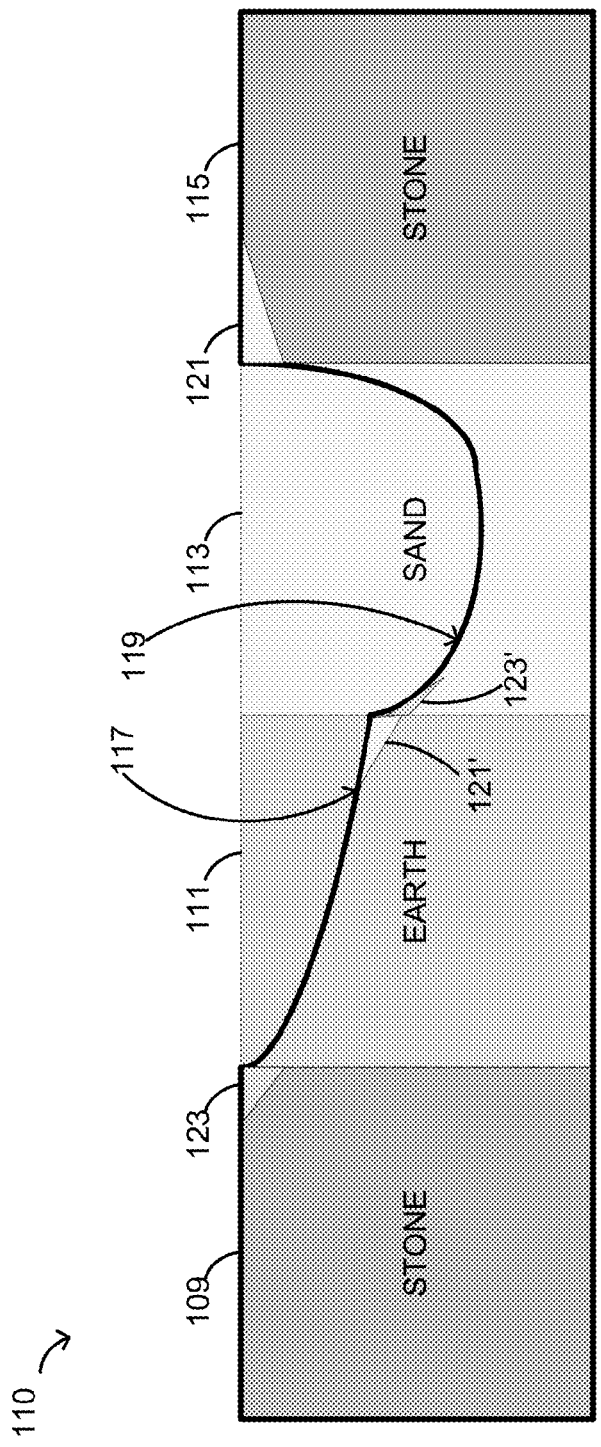
FIG. 15 illustrates a combined visual representation of four block objects of three different types.

FIG. 15 illustrates a series 110 of four adjacent block objects in which three types of block objects are shown, two stone block objects 109 and 115, an earth block object 111, and a sand block object 113. As the stone block objects 109 and 115 are rigid solids, their visual representations are simply cubes (in this implementation). The earth block object 111 is co-extensive on one face with the stone block object 109, along their common wall. However, the earth block object 111 may slope down (see the visual representation of the earth block object having a top border illustrated by curve 117) to a certain degree due to the granularity of the earth. In the same way, the sand block object 113 slopes down even more (see the visual representation of the sand block object having a top border illustrated in part by curve 119) due to its being even softer than earth. In this implementation, with the rule that non-rigid block objects must be coextensive with the common wall between themselves and rigid block objects, the sand block object 113 has a visual representation that extends over the face of the common wall between itself and the stone block object 115, and thus the curve 119 slopes upward at its right end to meet the top corner of the stone block object 115.

To see the modification made by the block object interaction, the square shape of the earth and sand block objects are shown along with their modified or combined visual representations indicated by curves 117 and 119. However, in an actual implementation it will be understood that the block objects do not extend above their top borders illustrated by these curves.

FIG. 15 also illustrates texture blending. In particular, when two block objects are adjacent, textures on their surfaces may be caused to appear to blend, so as to eliminate undesirable sharp edges between objects. Accordingly, such blending is illustrated in FIG. 15 by blending areas 121 and 123. In the implementation illustrated, the former is larger than the latter, because the sand block object 113 is softer and may be considered to spread more onto the adjacent stone block object 115 than will the earth block object 111 spread onto the stone block object 109. Other implementations may incorporate different amounts of blending. Because the stone block objects are rigid, their materials will generally not appear to blend onto adjacent block objects. However, the earth and sand block objects may blend into each other, as illustrated by the blending areas 121' and 123', as each is granular, just with differing degrees of softness. While the blending areas 121' and 123' appear as separate sections of earth and sand, it will be understood that in general a degree of blending may provide a single or graduated average texture across the blending area. Each type of block object has, as noted above, various interaction characteristics, and the same may include the degree to which the block object "bleeds over" or blends into a block object of a given type. It is noted that such blending generally only pertains to the appearance of the texture—the visual representation, at least in some implementations, will not actually bleed over or otherwise extend into grid spaces not associated with the block objects. That is, the visual representation, e.g., for collision purposes, of the earth block object 111 will not extend into the grid space occupied by the visual representation of the sand block object 113. However, in alternative implementations, it will be understood that the visual representation may be caused to bleed over into adjacent grid spaces, for collision or other purposes.

While FIG. 15 and other figures in this specification appears to show two-dimensional block objects and their visual representations, it will be understood that generally the systems and methods according to present principles will apply to any dimensionality, and especially those of current gaming applications, e.g., 2-D and 3-D systems.

Figure 16:
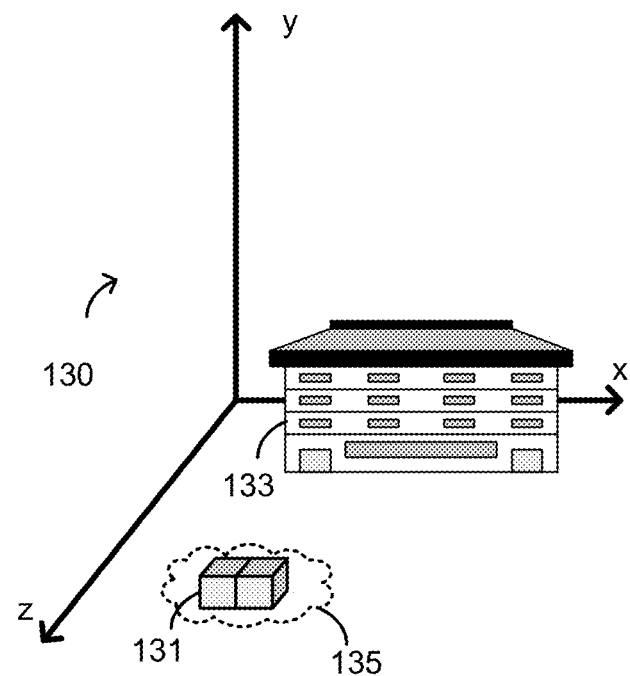
FIG. 16 illustrates a three-dimensional grid space with block objects occupying grid volumes.

As illustrated in FIG. 16, the grid space of the block objects, e.g., block objects 131 with visual representation 135, and the object space 130 of a simulation, may be the same space. In this case, the interaction of objects will be linked to their block object structure and visual representation. In addition, block objects can be modified, added, or removed to create changes in the simulation space. For example, a structure 133 could be built, then damaged by a car crash causing some block objects to be removed and other block objects to be modified, e.g., their visual models and textures changed. FIG. 16 illustrates a three-dimensional simulation, with Cartesian coordinates and x-, y-, and z-axes. In such a simulation, the grid spaces correspond with grid volumes. In a two-dimensional simulation, the grid spaces correspond with grid surfaces.

Figure 17A:
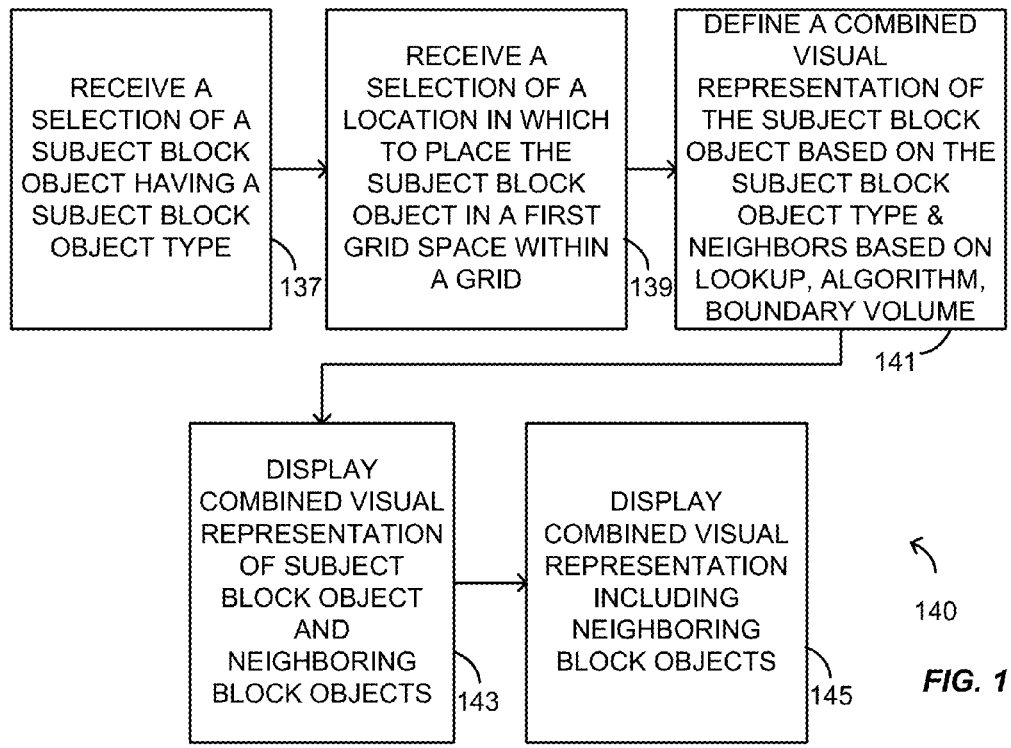
FIGS. 17(A)-17(C) are flowcharts showing various implementations of methods according to present principles.

FIG. 17(A) is a flowchart 140 of a general method according to present principles. In this method, a first step is that the object creation tool or interface receives a selection of a subject block object having a given type (step 137). The tool then receives a selection of a location in which to place the selected block object (step 139). This may be by way of dragging and dropping, receiving location coordinates, or the like. A combined visual representation is then defined (step 141) of the subject block object based on its type and that of neighboring block objects, including their types and positions. As noted above, the definition or determination of the combined visual representation may be by way of a lookup table, algorithmic or other analytic generation of a curve, surface, or plane, or by generation of a boundary volume within which the combined visual representation is defined.

In this regard it is noted that the term "combined visual representation" is occasionally used with respect to a single subject block object, but the same is still considered a "combined" visual representation because the visual representation of the subject block object is made in combination with block objects neighboring the subject block object, and in particular their types and positions.

The combined visual representation is then displayed (step 145), and the combined visual representation generally includes at least a representation of the subject block object and neighboring block objects as they interact in combination with each other.

Figure 17B:
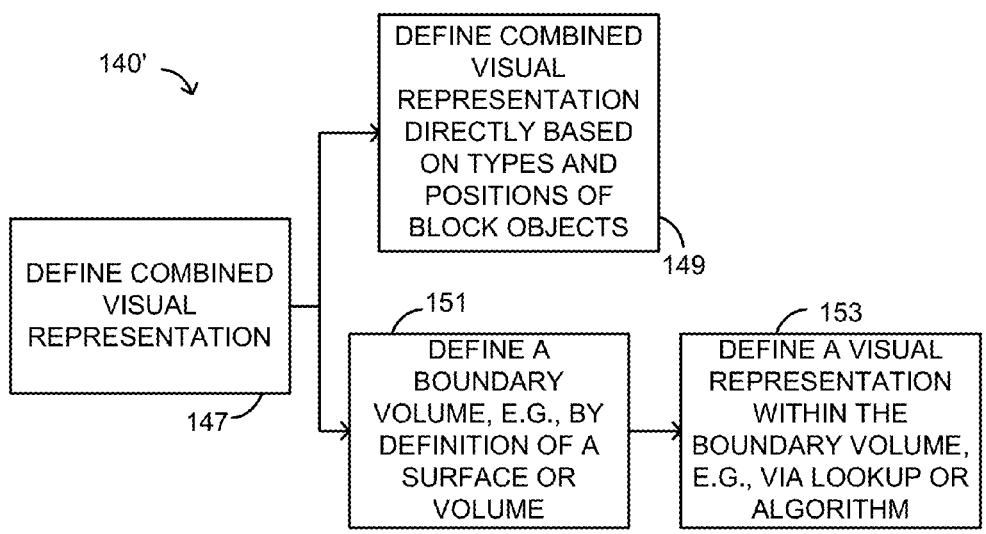

FIG. 17(B) is a flowchart 140' providing greater detail about the steps of defining (step 147) a combined visual representation. In particular, one way of defining a combined visual representation is by directly defining the combined visual representation based on the types and positions of block objects, and in particular that of the subject block object and that of its neighboring block objects (step 149). Another way of performing the step 147 is by the intermediary step of defining a boundary volume (step 151). Boundary volume definitions are described above, but the same generally relate to creating the boundary volume within a grid space corresponding to a subject block object, and then confining the visual representation of the subject block object to be within the boundary volume so defined (step 153). The boundary volumes may be created based on the parameters noted above, such as the type of the subject block object and the positions and types of its neighbors. The visual representation itself of the subject block object may be calculated, computed, defined, or otherwise determined by reference to a lookup table, pattern matching algorithm, or algorithmic generation of a visual representation based on the same or similar factors or parameters as have been noted.

Figure 17C:
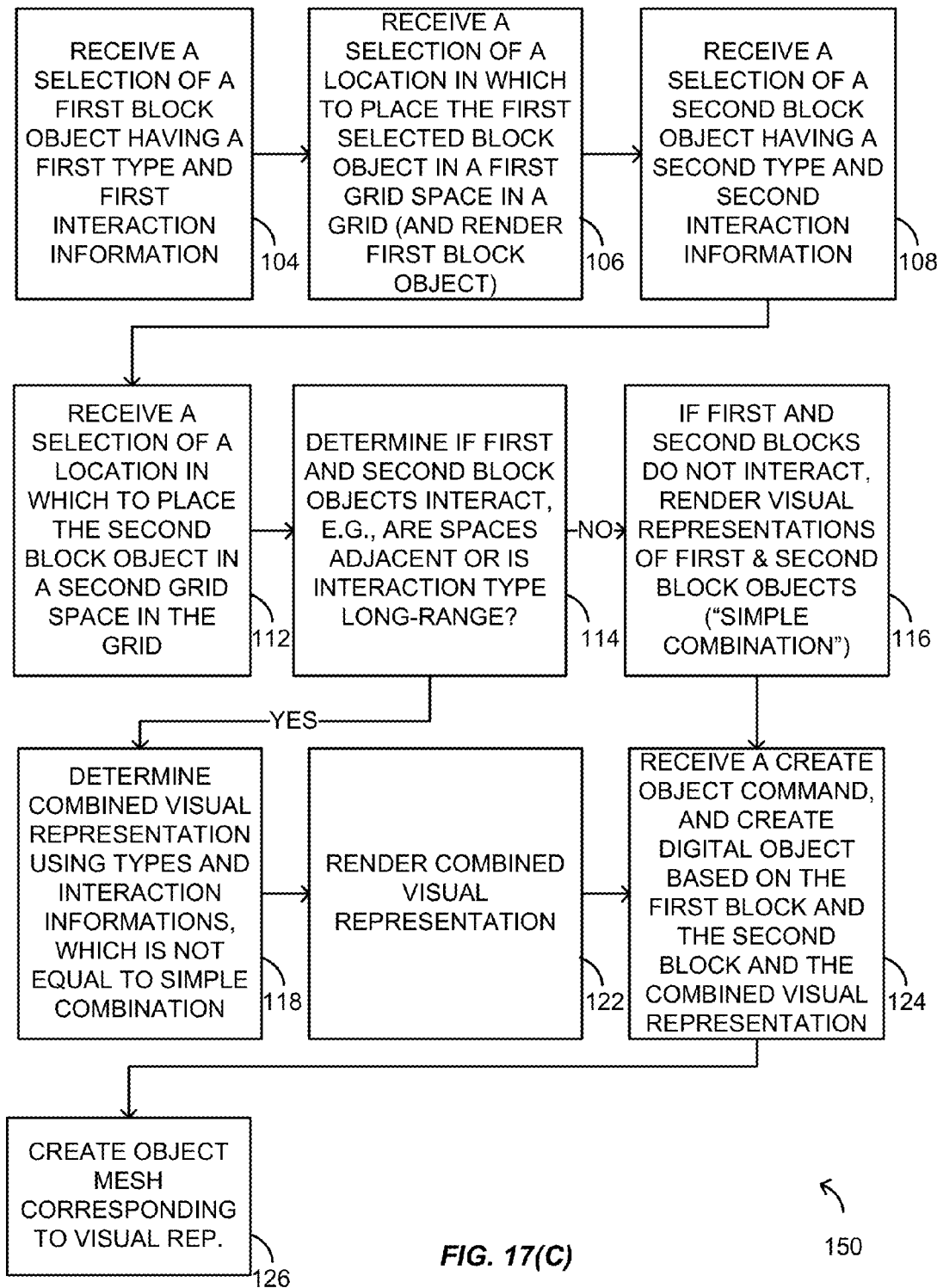

FIG. 17(C) illustrates a flowchart 150 of another method according to present principles. In a first step, the object creation tool receives a selection of a first block object having a first type and first interaction information, e.g., set of interaction characteristics (step 104). The object creation tool then receives a selection of a location in which to place the first selected block object, in a first grid space in a grid (step 106). The first block object is generally rendered to provide visual feedback to the creator. Such steps are then repeated for a second block object, with the second block object being selected (step 108) and placed in a second grid space in the grid (step 112). The second block object may, during placement, e.g., be dragged to a location, and rendered as an individual block object. However, if the same is placed in a location where a non-zero interaction exists with the first block object, then a combined visual representation is generally displayed of the combined assembly of block objects. Accordingly, a next step is to determine if the first and second block objects interact, e.g., whether the block objects are in adjacent grid spaces, or if a long-range interaction will come into play (step 114). If not, the visual representations may be displayed of a simple combination of the first and second block objects (step 116).

If the objects do interact, then a combined visual representation is determined, using the block types and interaction information, the combined visual representation not being the same as a simple combination (step 118). The determined combined visual representation is then rendered (step 122) on the display. The process repeats until the desired object is created, at which point the user issues and the object creation tool receives a "CREATE OBJECT" command, and a digital object (or template) is created based on the first block object, the second block object, and the combined visual representation (step 124). For additional manipulation of the created digital object, a step may follow of creating an object mesh corresponding to the visual representation (step 126). Additional manipulation of the digital object and mesh may be according to standard CG object manipulation techniques.

Figure 18:
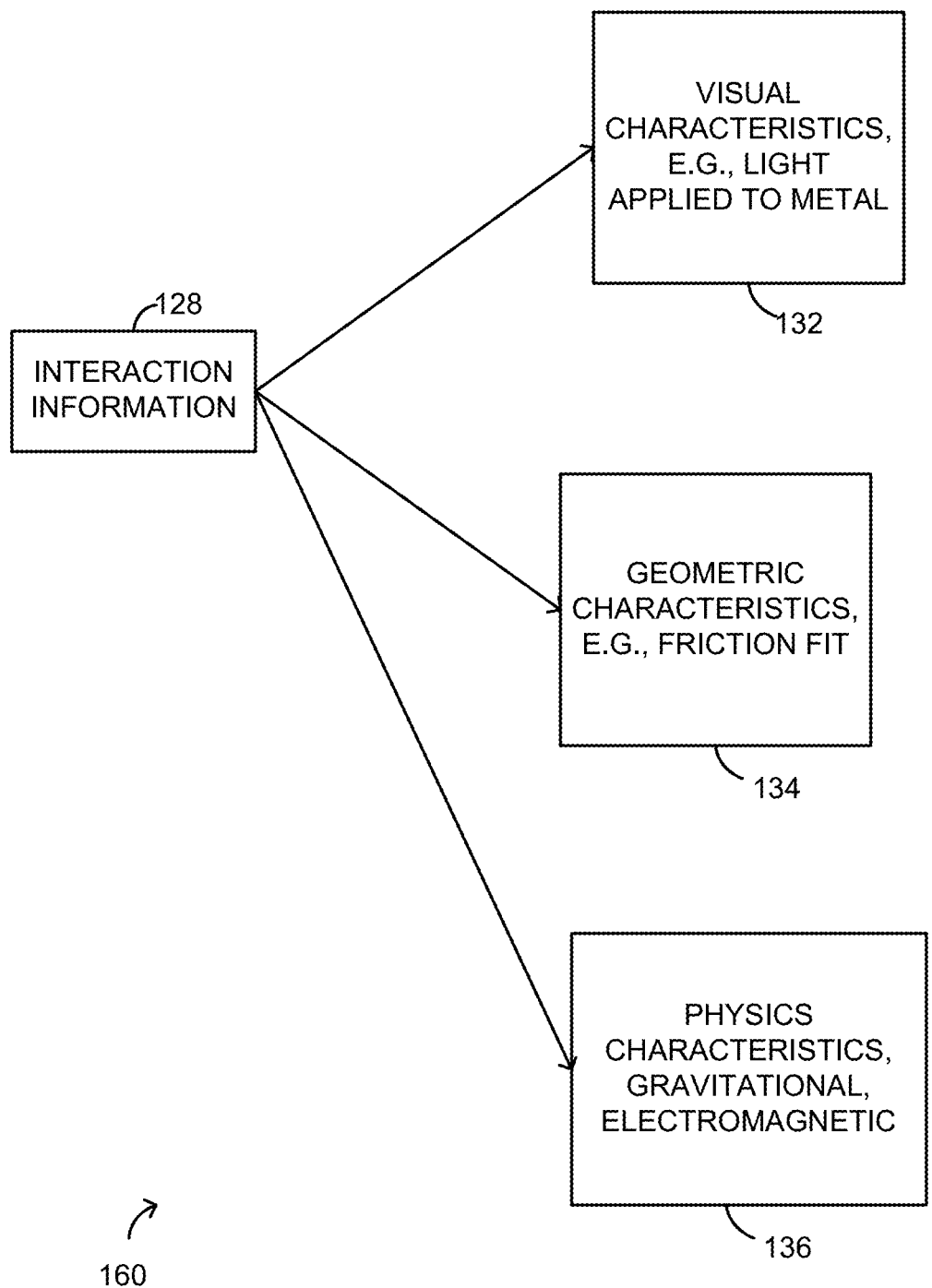
FIG. 18 is a diagram indicating various types of interactions.

FIG. 18 is a schematic diagram 160 illustrating types of interaction information 128. Generally interactions may be based on the type of subject block object and that of neighboring block objects, as well as the distance of the subject block object from the other block objects, as well as the distance over which a particular block object type may be "effective", in the sense of spreading to adjacent grid spaces, and which may be termed an "effect distance". For example, a rigid solid may have a short effect distance, while a non-rigid solid may have a longer one, and a gas may have an even longer effect distance. Objects may interact according to visual characteristics (step 132), geometric characteristics (step 134), physics characteristics (step 136), and the like. For example, with respect to physics characteristics, objects with virtual mass or charge may interact according to gravitational or electromagnetic effects simulated by the environment, and the like. With respect to geometric characteristics, objects that "fit into" each other may interact according to, e.g., friction (such geometric characteristics may well bear or rely on certain physics characteristics as well). With respect to visual characteristics, one block object type may be of a fluorescent solid, and if an adjacent block object has a metal type, a specular reflection may be caused as part of an interaction. It will be understood that the above types of interaction characteristics are purely exemplary, and is not an exhaustive list.

Figure 19:
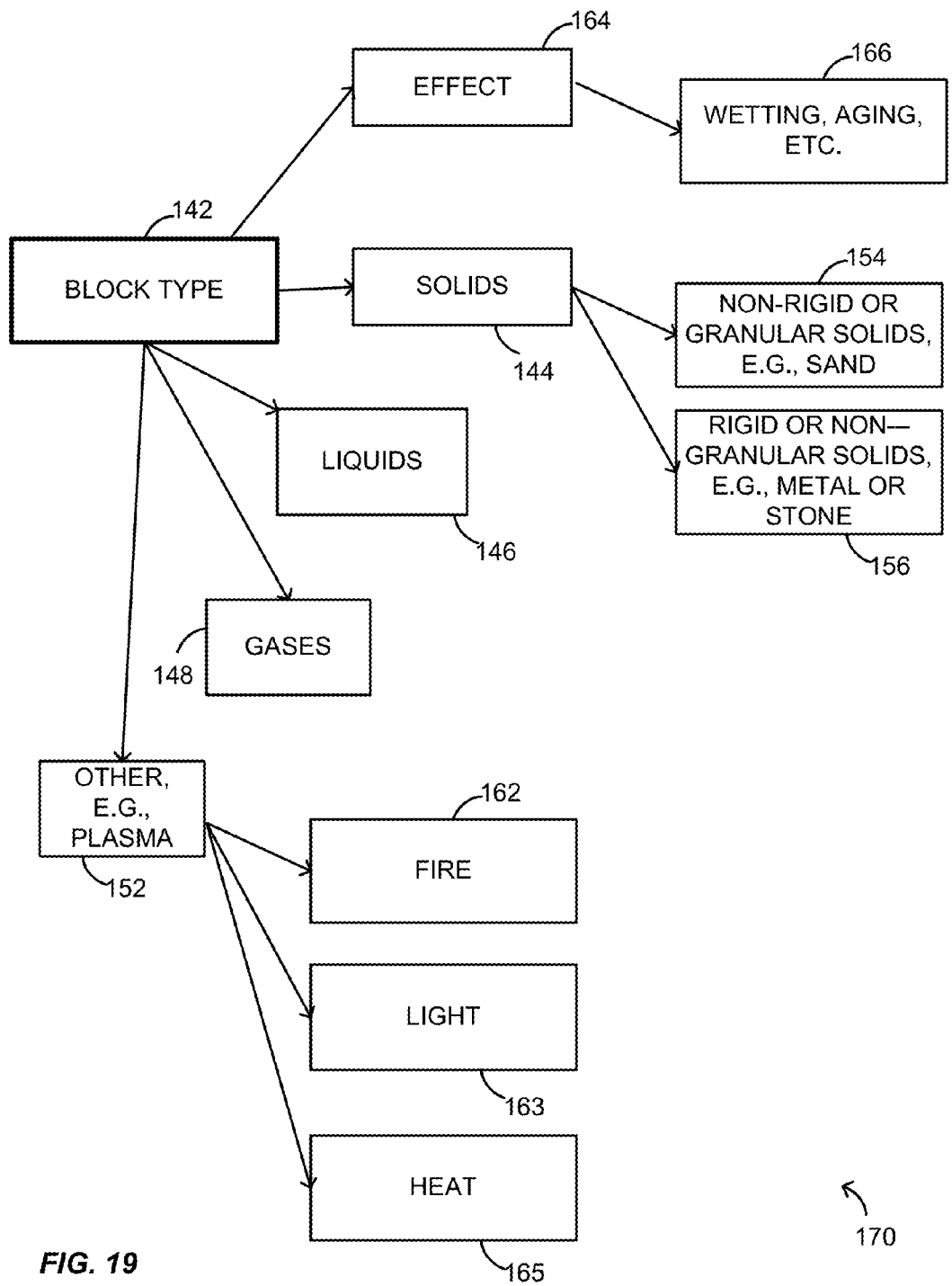
FIG. 19 is a diagram indicating various types of block objects.

Rigid and non-rigid (or deformable) solid block objects are disclosed above, but it is noted that block objects may have types corresponding to any material, not only for solids. For example, block objects can be used for water, fire, gas, cloth, rope, hair, grass, light effects, etc. In more detail, FIG. 19 is a diagram 170 illustrating various types of blocks 142. Block types may include solids 144, liquids 146, gases 148, as well as other types, e.g., plasmas 152. With regard to solids, block types may include non-rigid or granular solids such as sand 154, rigid or non-granular solids such as metals or stone 156, as well as many other types. With regard to liquid block object types, such may be handled by use or creation of a rule which generates additional block objects of type "liquid" in grid spaces adjacent block objects of type "liquid".

With regard to block types that are not solids, liquids, or gases, block types may include fire 162, light 163, heat 165, and the like. Such block object types may alter or otherwise have an effect on block objects adjacent them, or within a long-range interaction distance. In some cases, such block types may share a grid space with another block object, and may modify the same accordingly. A related feature according to present principles is an effect block object, which is described in greater detail below.

In particular, FIG. 19 illustrates an "effect" block type 164, such being a block type that is applied to a block object in a common grid space, as opposed to an adjacent grid space or one within a long-range interaction distance. Such effect block types 164 may include wetting, aging, lighting, heating, or other effects 166. The same may be isotropic or anisotropic, e.g., having a directionality associated with its interaction. In this case, a user places a non-effect block object in a grid space, and then places an effect block object in the same grid space. Alternatively, the effect block object may be placed in the grid space first. For example, if an object creator wished to create a block object of mud, the object creator may place a dirt or earth block object in a grid space, followed by placement of a wetting effect block object in the same grid space. It is noted that a similar effect may be caused by placing a water block object adjacent a block object, but in the case of adjacent grid spaces, the dirt block object would be preferentially wetted on a side facing the water block object. In the case of a common grid space, the dirt block object may be uniformly wetted. Such illustrates the greater flexibility provided by systems and methods according to present principles. As with the case of the interaction characteristics, the above block types are purely illustrative and many others will be understood by one of ordinary skill in the art given this teaching.

Figure 20:
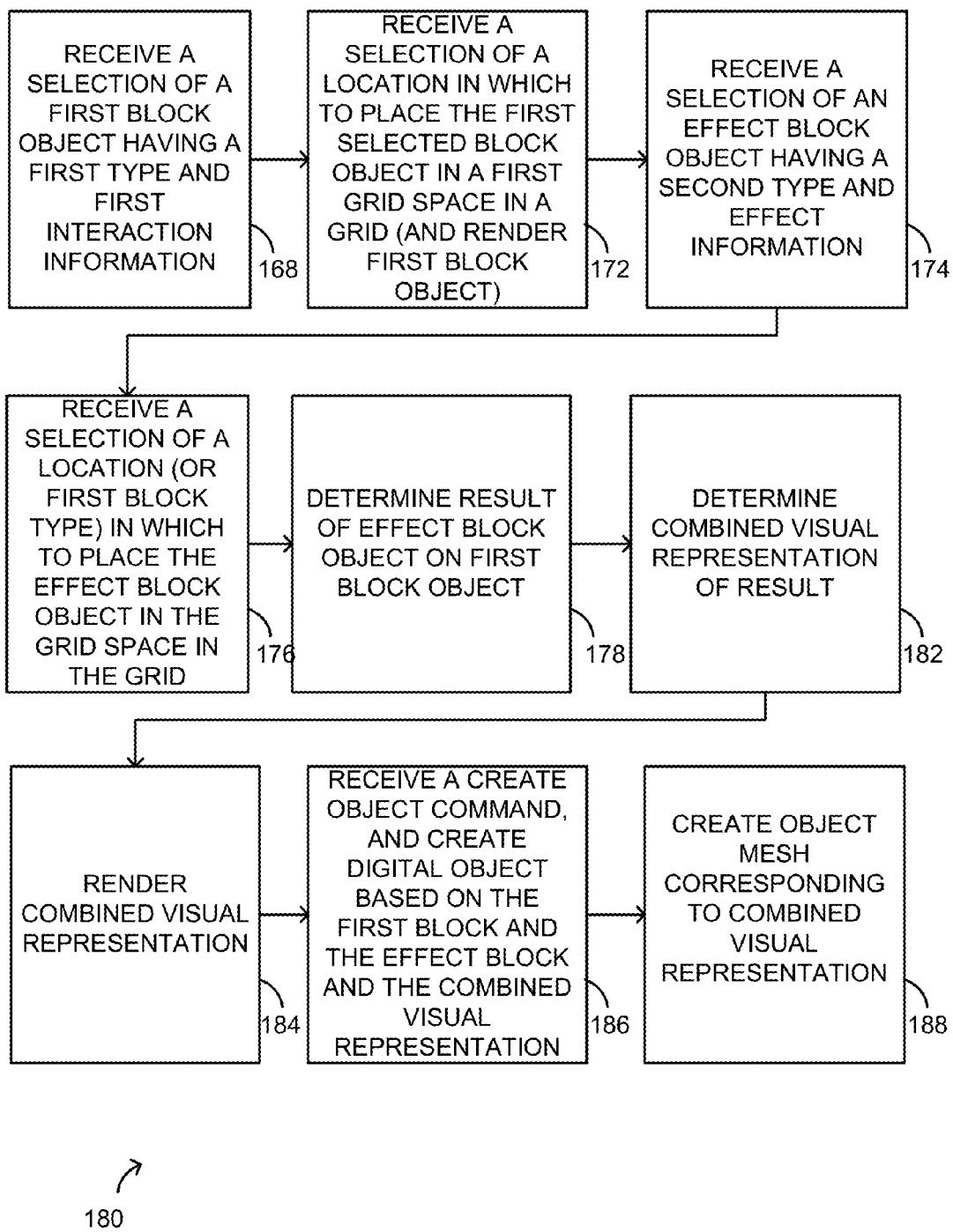
FIG. 20 is a flowchart of another method according to present principles, in particular with regard to "effect block objects".

FIG. 20 illustrates a flowchart 70 of a method of use for effect block objects according to present principles. In a first step, the object creation tool receives a selection of a first block object having a first type and first interaction information, e.g., set of interaction characteristics (step 168). The object creation tool then receives a selection of a location in which to place the first selected block object, in a first grid space in a grid (step 172). The first block object may be rendered to provide visual feedback to the creator. The object creation tool then receives a selection of an effect block object having a second type and effect information (step 174). Following selection of the effect block object type, a selection is received of a location of a grid space in which to place the effect block object in the grid (step 176). In this step, either a location may be received or an indication of a previously-placed block object (or block object type, if such is sufficient to identify a block object or group of block objects) may be received, on which the effect block object is to be applied. For such, the user interface may advantageously employ drag-and-drop functionality. It is understood that the order of selection and placement of the first block object and the effect block object are arbitrary. A result is then determined of the effect block object on the first block object (step 178). The combined visual representation of the result is determined (step 182). The combined visual representation may then be rendered on a display (step 184).

If the object creator approves, the object creator issues and the object creation tool receives a "CREATE OBJECT" command, and a digital object (or; alternatively, template) is created based on the first block object, the effect block object, and the combined visual representation (step 186). For additional manipulation of the created digital object, a step may follow of creating an object mesh corresponding to the visual representation (step 188). As before, additional manipulation of the digital object and mesh may be according to standard CG object manipulation techniques.

Figure 21:
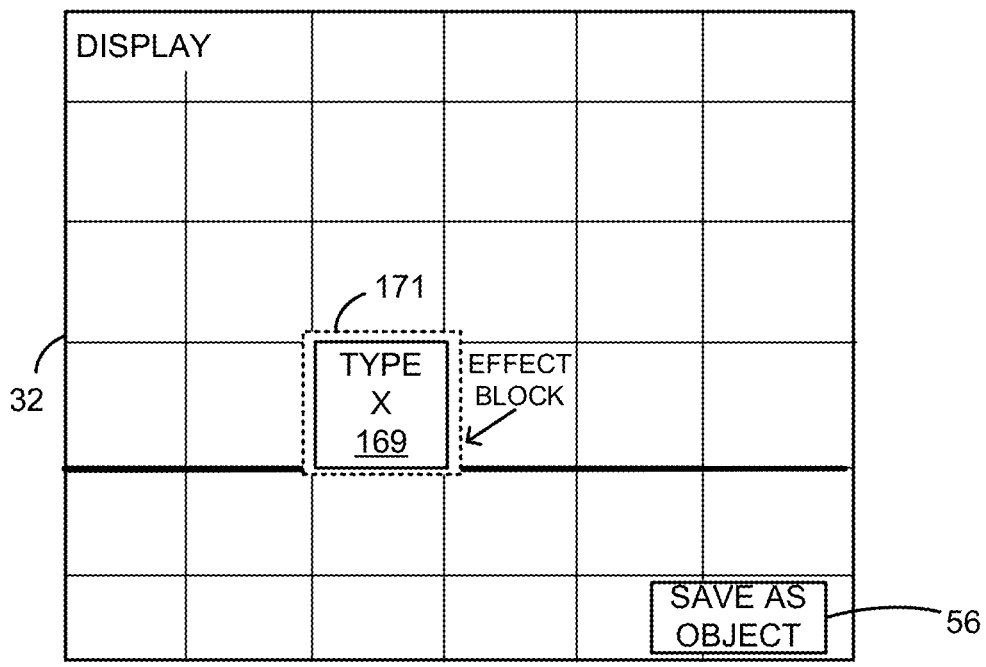
FIG. 21 illustrates a schematic of an effect block object within a grid.

FIG. 21 illustrates a schematic diagram of an effect block object 171 being applied to a block object of type X 169. As can be seen, both block objects 169 and 171 are applied to the same grid space within the grid 32. The effect block object 171 modifies the block object 169 in such a way as to affect its properties, or interaction characteristics, and thus its visual representation. For example, if the block object 169 has a type that is identified as "earth", and if the effect block object 171 represents "water", then the combined block objects, and in particular the combined visual representation, may be "mud".

Figure 22:
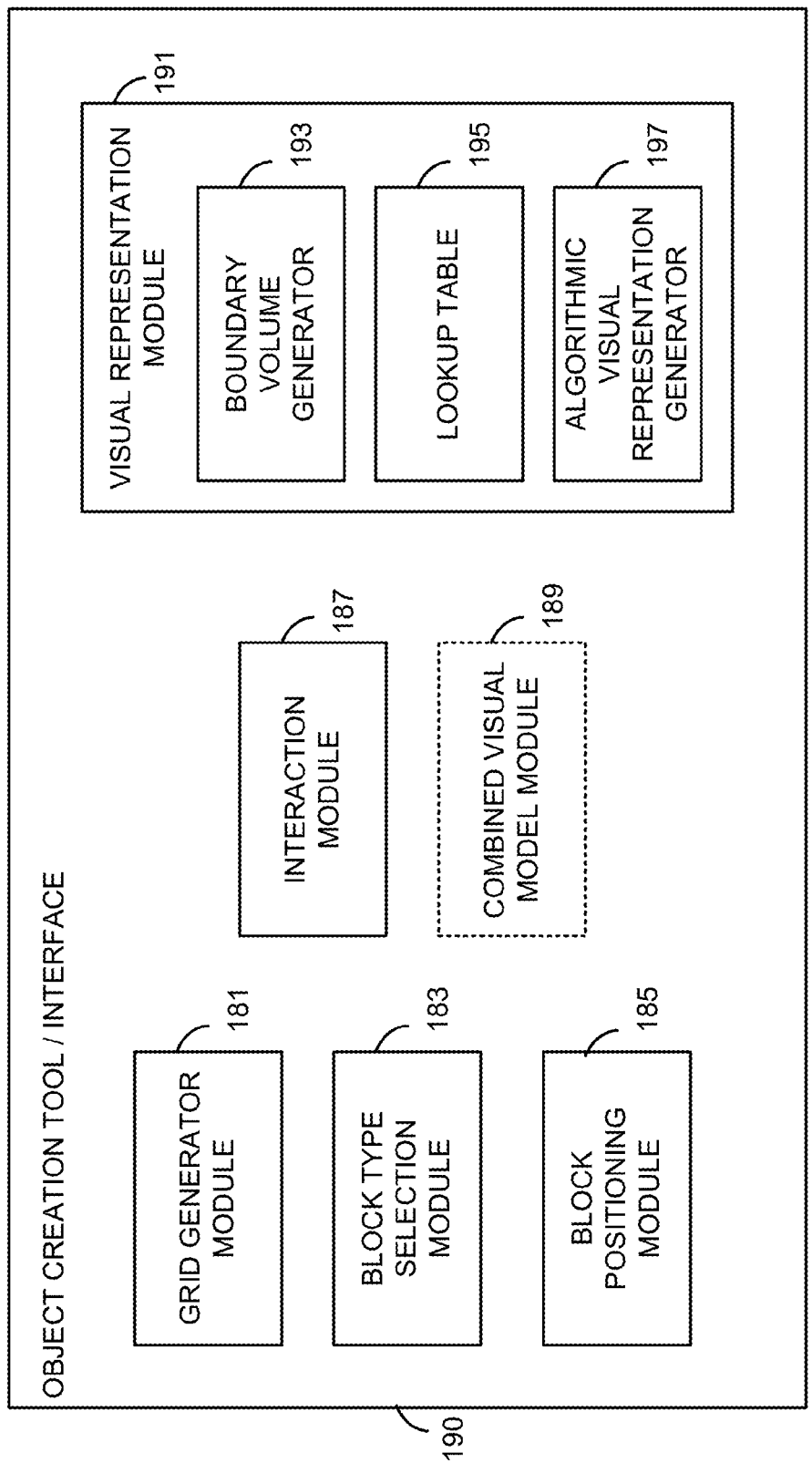
FIG. 22 illustrates an exemplary object creation tool according to present principles.

Referring to FIG. 22, an exemplary modular object creation tool and interface 190 is illustrated. The tool and interface 190 may be implemented directly within an online environment, such as within a multiplayer game, or may be a separate tool that constructs objects off-line which can then be transported or otherwise placed into the online environment.

The tool and interface 190 includes a grid generator module 181 which creates or constructs the space in which the digital object will be created. The grid may exist in the online environment, in the sense of sharing the same units, origin, axes, and the like, or may simply exist in a separate object editor. A block type selection module 183 is provided, such that a user may choose what type of block object they wish to generate. As noted above, typical block object types include rigid solids such as metal, stone, and rock, non-rigid solids such as sand, earth, dirt, as well as liquids, gases, and the like. A block positioning module 185 is then employed to place a block object of the selected type at a selected location within the grid generated by the module 181. The block positioning module 185 may include drag-and-drop functionality, or the user may be enabled to enter a grid space location using an appropriate coordinate system (including non-Cartesian ones), or the like. Users may further be enabled to program block object type selection and placement using, e.g., a suitable programming or macro language, or one created especially for the tool 180. For example, for a spiral-shaped digital object, a user may be enabled to enter a function such as r=θ into the block positioning module and the same may position the created block objects accordingly.

An interaction module 187 then determines if an interaction between placed block objects is such that a visual representation of their combination is different than just a simple representation of individual block objects. Put another way, the interaction module 187 determines if an interaction between two given block objects is finite or null. The interaction module 187 may perform this function in a number of ways, including by consideration of a subject block type and the block types of neighboring block objects. The interaction module 187 may also consider individual interaction information associated with each block object or by considering each block object type, and the distance between the blocks, and then using, e.g., a lookup table or database, to determine if an interaction may happen. Other methods of determining whether two block objects interact may also be employed.

A visual representation module 191 may then be employed to render the assembly of block objects. If the block objects have a finite interaction, where this term is used to mean a non-zero level of interaction, then the visual representation module 191 renders the combined visual representation and the same is different from a simple combination of the block objects' individual visual representations. The visual representation module 191 may determine a combined visual representation based on the block objects and their interaction information, or may simply render what is provided to it by an optional combined visual model module 189. In this latter case, a combined visual model module 189 creates a combined visual model based on the individual block objects and their interaction information. This combined visual model is then simply a new CG model which can be passed to the visual representation module 191 for rendering.

The combined visual representation module 191 may include a number of submodules, including a boundary volume generator module 193 for creation of boundary volumes in implementations where such are employed. For example, the boundary volume generator module 193 may operate on vertices of a grid space, where the grid space is associated with a block object, and may operate so as to translate one or more of the vertices defining the grid space in order to result in new locations for vertices which may be employed in the creation of a boundary volume. The combined visual representation of the block object may then be defined within the boundary volume so created. A lookup table module 195 may be included within the combined visual representation module 191 in order to store a number of different and distinct combined or modified visual representations of subject block objects, where one index pertains to the subject block object type, and other indices involved in the lookup pertain to neighboring block object types and their positions relative to the subject block object. An algorithmic visual representation generator 197 may also form a portion of the visual representation module 191, particularly in cases where a lookup table is not employed (although the same may be used in conjunction with a lookup table in some implementations). The algorithmic visual representation generator 197 uses parameters corresponding to the subject block object type and the types and positions of neighboring block objects to generate a curve, surface, or volume analytically, rather than by a lookup table. The generated curve, surface, or volume may serve as the basis for a boundary volume or for the combined visual representation.

It will be understood that other modules may be employed, but which are not shown in the figure for clarity. For example, a "save object" module may be employed to store the created assembly of block objects. An "edit" module may be employed to provide editing functionality of a given block object or group of block objects. Other modules will also be understood.

Each of the above-described modules may be implemented in a number of ways. For example, the modules may be implemented within non-transitory computer-readable media, as instructions encoded in a computer-readable form. The modules may also be implemented within computer memories, the computer memories storing instructions that perform the functions of the modules. Other implementations will also be seen.

What has been described are systems and methods for creating digital objects in highly flexible and interesting ways. Users are enabled to create numerous digital objects using block objects, and can modify the block objects and thus the resulting digital objects in a wide range of ways. Using systems and methods according to present principles, users may generate a visual representation of the world that is not constrained strictly to the visual grid that the world is represented on. Moreover, users are not simply pulling rigid shapes and stacking them. Rather, users are taking into account the data of disparate materials and how they interact with each other.

Additional variations and implementations are also possible. The systems and techniques described above are not limited to the examples described. For example, while discussed in the context of games and simulations, other implementations can include other contexts such as online environments, social networking, shopping, e.g., to create digital objects indicating items for purchase, and the like. As noted above each block object may be the same size in the grid and may occupy one space in the grid, but the visual representation can be freely defined; however, constraints may be placed on the visual representation if desired. For example, a principle of conservation of virtual mass or volume may be employed to restrain the size of block objects which "spill over" or extend to other grid spaces beyond those in which they are based. As another variation, while the systems and methods have been described such that each block object has defined interaction information or characteristics, it will be understood that in some implementations the block objects do not contain such information but rather the information is held in a database, a lookup table, or the like. When two block objects are adjacent each other, the database or lookup table is then consulted by the system to determine if an interaction will take place. While boundary volumes have been disclosed in particular of rectangular solids, the same may be other polygonal solids as well. In the creation of a boundary volume, rather than just moving vertices, vertices may be added or subtracted. For example, the sand pile of FIG. 11 could be made in an alternative implementation by adding a vertex indicating the peak of the sand block, where the peak is within or even outside the grid volumes associated with the block objects.

The system and method may be applied to other materials including fabrics and cloth. In the case of such, cloth adjacent a rigid solid black object such as the ground or earth may have a visual representation including a level of draping or folding.

As an example of another variation, as shown in FIG. 13, a non-rigid solid may deform so as to meet a rigid solid, thus forming a common wall therewith. As the rigid solid is generally considered incapable of moving or changing its shape or visual representation, absent a phase transformation, it is the non-rigid solid that is required to deform. Of course, in some situations, this effect may cause a non-rigid solid block object, which has transformed to achieve a more physical or "common" or "expected" shape, to be re-formed into a default block object shape, e.g., a cube. For example, a non-rigid block object adjacent a rigid block object may deform so as to form a common wall as shown in FIG. 13. However, if a rigid solid block object is subsequently placed on the opposite side of the non-rigid block object (in FIG. 13, on the left side of block object 91), then the non-rigid solid block object 91 may be caused to re-form to its default block object shape or simple visual representation, e.g., as a rectangular solid, so as to form a common wall with each of the rigid solid block objects.

The grid has been disclosed as a 2D or 3D uniform grid, but the same may also be non-uniform, e.g., non-linear. Other variations are also possible and will be readily apparent to those of skill in the art in light of this new disclosure.

One implementation includes one or more programmable processors and corresponding computer system components to store and execute computer instructions and data, such as to provide the structures, systems, and interfaces to allow the selection and placement of block objects, analysis and determination of their interaction characteristics and rendering of block objects and combined visual representations and the like. One such computing environment is disclosed below.

Figure 23:
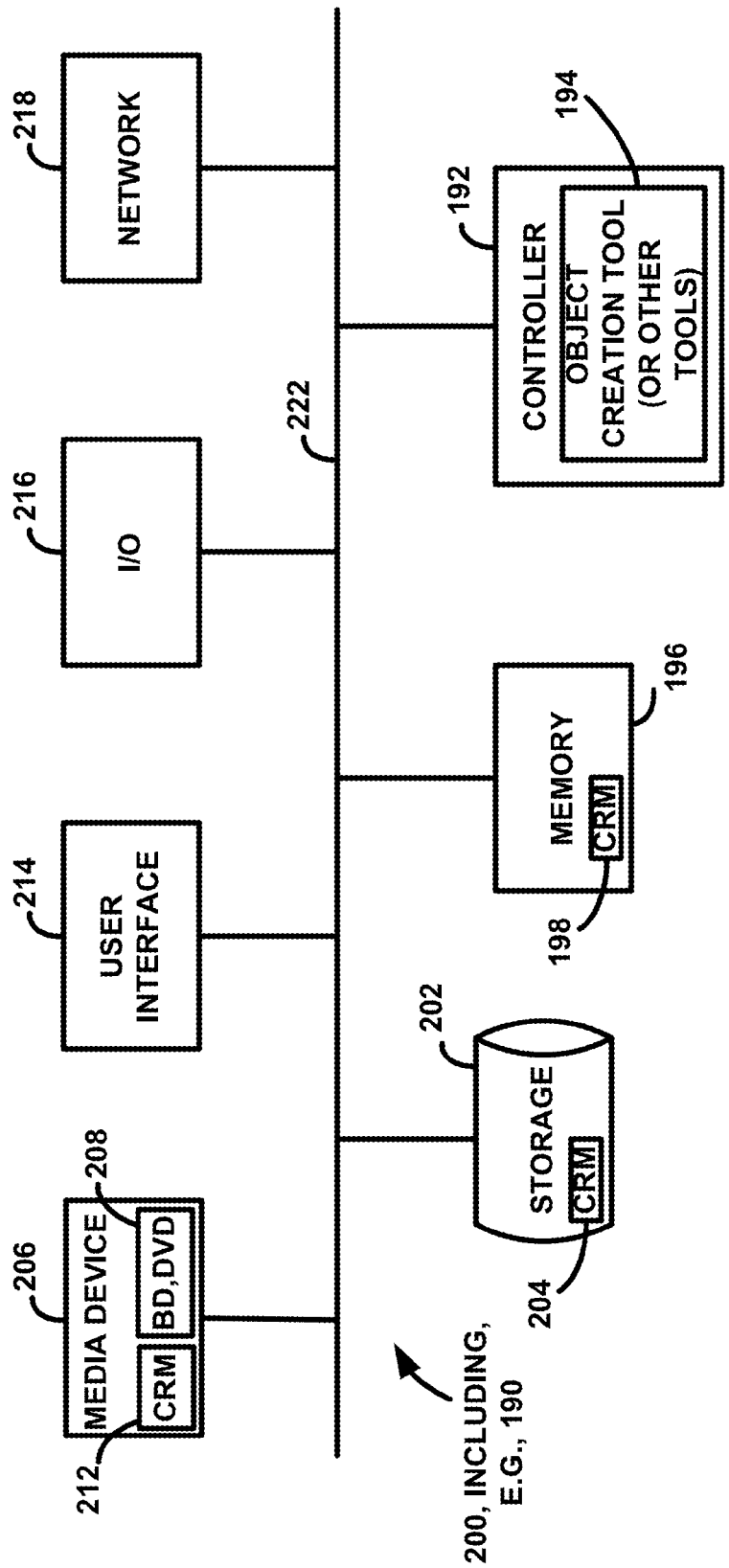
FIG. 23 is an exemplary computing environment in which the methods according to present principles may be implemented.

Referring to FIG. 23, a representation of an exemplary computing environment 200 in which the system and method may be implemented is illustrated.

The computing environment 200 includes a controller 192, a memory 196, storage 202, a media device 206, a user interface 214, an input/output (I/O) interface 216, and a network interface 218. The components are interconnected by a common bus 222. Alternatively, different connection configurations can be used, such as a star pattern with the controller at the center.

The controller 192 includes a programmable processor and controls the operation of an object creation tool 194. The controller 192 loads instructions from the memory 196 or an embedded controller memory (not shown) and executes these instructions to control the system.

Memory 196, which may include non-transitory computer-readable memory 198, stores data temporarily for use by the other components of the system. In one implementation, the memory 196 is implemented as DRAM. In other implementations, the memory 196 also includes long-term or permanent memory, such as flash memory and/or ROM.

Storage 202, which may include non-transitory computer-readable memory 204, stores data temporarily or long-term for use by other components of the system, such as for storing data or instructions. In one implementation, the storage 202 is a hard disc drive or a solid state drive.

The media device 206, which may include non-transitory computer-readable memory 212, receives removable media and reads and/or writes data to the inserted media. In one implementation, the media device 206 is an optical disc drive or disc burner, e.g., a writable Blu-ray® disc drive 208.

The user interface 214 includes components for accepting user input, e.g., the user indication of digital objects or other aspects discussed above, and presenting a display, e.g., of a partially-constructed digital object or a list of block object types, to the user. In one implementation, the user interface 214 includes a keyboard, a mouse, audio speakers, and a display. The controller 192 uses input from the user to adjust the operation of the computing environment.

The I/O interface 216 includes one or more I/O ports to connect to corresponding I/O devices, such as external storage or supplemental devices, e.g., a printer or a PDA. In one implementation, the ports of the I/O interface 216 include ports such as: USB ports, PCMCIA ports, serial ports, and/or parallel ports. In another implementation, the I/O interface 216 includes a wireless interface for wireless communication with external devices.

The network interface 218 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G/LTE, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for creating digital objects, comprising:
receiving a selection of a subject block object having a subject type;
receiving a selection of a location in which to place the subject block object, the location defining a first grid space within a grid, the grid space at least partially surrounded with one or more neighboring block objects, each associated with a type;
defining a combined visual representation of the subject block object based on the subject type and on the neighboring block objects and their respective types; and
displaying the combined visual representation of the subject block object at the selected location;
wherein the defining and displaying a combined visual representation of the subject block object includes:
defining a boundary volume, the boundary volume based on the subject type and on the neighboring block objects and their respective types; and defining and displaying a combined visual representation for the subject block object, the visual representation bounded by the boundary volume; and wherein the defining a boundary volume includes defining a planar surface within the grid space and parallel to a face of the grid space associated with the selected location but translated a distance from the face, wherein the boundary volume equals the grid space minus a volume defined by an area of the planar surface times the translation distance, and wherein a position of the defined planar surface is based on the subject block object type and on the neighboring block objects and their respective types and positions.

2. The method of claim 1, further comprising displaying a visual representation of the one or more neighboring block objects.

3. The method of claim 2, further comprising a step of blending textures associated with the subject block object with textures associated with at least one of the neighboring block objects.

4. The method of claim 1, wherein at least one of the neighboring block objects has a type "air", and wherein at least one of the neighboring block objects has a type "rigid solid".

5. The method of claim 1, wherein each grid space represents a grid volume, each grid volume has the shape of a rectangular solid, the grid represents a three-dimensional space, and the number of neighboring block objects equals twenty-six.

6. The method of claim 1, wherein the defining a combined visual representation for the subject block object includes retrieving a combined visual representation from a lookup table, the retrieving based on the subject block object type and on the neighboring block objects and their respective types.

7. The method of claim 1, wherein the defining a combined visual representation for the subject block object includes calculating a combined visual representation using an algorithm, the algorithm including parameters based on the subject type and on the neighboring block objects and their respective types.

8. The method of claim 1, wherein the combined visual representation is defined to have the same shape and position as the boundary volume.

9. The method of claim 1, wherein if one of the neighboring block objects has a type 'rigid solid', and if the one neighboring block object shares a common wall with the subject block object, then the combined visual representation defined of the subject block object is such that the subject block object at least extends over the common wall.

10. The method of claim 1, further comprising basing collision detection of the subject block object on at least the combined visual representation.

11. The method of claim 1, wherein the subject block object type is liquid, and further comprising generating a block object of type liquid in a neighboring grid space, the neighboring grid space not already occupied by a solid block object.

12. A method of creating digital objects, comprising:
receiving a selection of a subject block object having a subject type;
receiving a selection of a location in which to place the subject block object, the location defining a first grid space within a grid, the grid space at least partially surrounded with one or more neighboring block objects, each associated with a type;
defining a combined visual representation of the subject block object based on the subject type and on the neighboring block objects and their respective types; and
displaying the combined visual representation of the subject block object at the selected location;
wherein the defining and displaying a combined visual representation of the subject block object includes:
defining a boundary volume, the boundary volume based on the subject type and on the neighboring block objects and their respective types; and
defining and displaying a combined visual representation for the subject block object, the visual representation bounded by the boundary volume; and
wherein the defining a boundary volume includes defining a surface within the grid space associated with the selected location, wherein the boundary volume equals the grid space minus a volume defined by the surface, and wherein a position and orientation of the defined surface is based on the subject block object type and on the neighboring block objects and their respective types and positions.

13. The method of claim 12, wherein each grid space represents a grid volume, each grid volume has the shape of a rectangular solid, the grid represents a three-dimensional space, and the number of neighboring block objects equals twenty-six.

14. The method of claim 12, wherein the defining a combined visual representation for the subject block object includes retrieving a combined visual representation from a lookup table, the retrieving based on the subject block object type and on the neighboring block objects and their respective types.

15. The method of claim 12, wherein the defining a combined visual representation for the subject block object includes calculating a combined visual representation using an algorithm, the algorithm including parameters based on the subject type and on the neighboring block objects and their respective types.

16. The method of claim 12, wherein the combined visual representation is defined to have the same shape and position as the boundary volume.

17. The method of claim 12, wherein if one of the neighboring block objects has a type 'rigid solid', and if the one neighboring block object shares a common wall with the subject block object, then the combined visual representation defined of the subject block object is such that the subject block object at least extends over the common wall.

18. The method of claim 12, further comprising basing collision detection of the subject block object on at least the combined visual representation.

19. A method of creating digital objects, comprising:
receiving a selection of a subject block object having a subject type;
receiving a selection of a location in which to place the subject block object, the location defining a first grid space within a grid, the grid space at least partially surrounded with one or more neighboring block objects, each associated with a type;
defining a combined visual representation of the subject block object based on the subject type and on the neighboring block objects and their respective types; and
displaying the combined visual representation of the subject block object at the selected location;
wherein the defining and displaying a combined visual representation of the subject block object includes:

defining a boundary volume, the boundary volume based on the subject type and on the neighboring block objects and their respective types; and defining and displaying a combined visual representation for the subject block object, the visual representation bounded by the boundary volume; and wherein the defining a boundary volume includes defining a closed surface within the grid space associated with the selected location, wherein the boundary volume is the volume within the closed surface, and wherein a position and orientation of the defined closed surface is based on the subject block object type and on the neighboring block objects and their respective types and positions.

20. The method of claim 19, wherein each grid space represents a grid volume, each grid volume has the shape of a rectangular solid, the grid represents a three-dimensional space, and the number of neighboring block objects equals twenty-six.

21. The method of claim 19, wherein the defining a combined visual representation for the subject block object includes retrieving a combined visual representation from a lookup table, the retrieving based on the subject block object type and on the neighboring block objects and their respective types.

22. The method of claim 19, wherein the defining a combined visual representation for the subject block object includes calculating a combined visual representation using an algorithm, the algorithm including parameters based on the subject type and on the neighboring block objects and their respective types.

23. The method of claim 19, wherein the combined visual representation is defined to have the same shape and position as the boundary volume.

24. The method of claim 19, wherein if one of the neighboring block objects has a type 'rigid solid', and if the one neighboring block object shares a common wall with the subject block object, then the combined visual representation defined of the subject block object is such that the subject block object at least extends over the common wall.

25. The method of claim 19, further comprising basing collision detection of the subject block object on at least the combined visual representation.

26. A method for creating digital objects, comprising:
receiving a selection of a subject block object having a subject type;

receiving a selection of a location in which to place the subject block object, the location defining a first grid space within a grid, the grid space at least partially surrounded with one or more neighboring block objects, each associated with a type;

defining a combined visual representation of the subject block object based on the subject type and on the neighboring block objects and their respective types; and displaying the combined visual representation of the subject block object at the selected location;

wherein each grid space represents a grid volume, each grid volume has the shape of a rectangular solid, the grid represents a three-dimensional space, and the number of neighboring block objects equals twenty-six; and wherein a grid volume occupied by the subject block object is associated with a set of eight vertices, each of the eight vertices surrounded by eight of the twenty-six neighboring block objects, and wherein the defining a combined visual representation of the subject block object includes calculating a boundary volume for the subject block object, the boundary volume at least in part calculated by translating each of the eight vertices associated with the grid volume a translation distance based on the subject block object type and on the eight neighboring block objects and their respective types and positions.

27. The method of claim 26, wherein the translation distance of at least one of the eight vertices is zero.

28. The method of claim 27, wherein the translation distance is zero if one of the eight neighboring blocks has a type 'rigid solid'.

29. The method of claim 26, wherein at least one of the neighboring block objects has a type "air", and wherein at least one of the neighboring block objects has a type "rigid solid".

30. The method of claim 26, wherein the defining a combined visual representation for the subject block object includes retrieving a combined visual representation from a lookup table, the retrieving based on the subject block object type and on the neighboring block objects and their respective types.

31. The method of claim 26, wherein the defining a combined visual representation for the subject block object includes calculating a combined visual representation using an algorithm, the algorithm including parameters based on the subject type and on the neighboring block objects and their respective types.

32. The method of claim 26, wherein the combined visual representation is defined to have the same shape and position as the boundary volume.

33. The method of claim 26, wherein if one of the neighboring block objects has a type 'rigid solid', and if the one neighboring block object shares a common wall with the subject block object, then the combined visual representation defined of the subject block object is such that the subject block object at least extends over the common wall.

34. The method of claim 26, further comprising basing collision detection of the subject block object on at least the combined visual representation.

35. The method of claim 26, wherein the subject block object type is liquid, and further comprising generating a block object of type liquid in a neighboring grid space, the neighboring grid space not already occupied by a solid block object.

36. A method for creating digital objects, comprising:
receiving a selection of a subject block object having a subject type;

receiving a selection of a location in which to place the subject block object, the location defining a first grid space within a grid, the grid space at least partially surrounded with one or more neighboring block objects, each associated with a type;

defining a combined visual representation of the subject block object based on the subject type and on the neighboring block objects and their respective types; and displaying the combined visual representation of the subject block object at the selected location;

wherein if one of the neighboring block objects has a type 'rigid solid', and if the one neighboring block object shares a common wall with the subject block object, then the combined visual representation defined of the subject block object is such that the subject block object at least extends over the common wall; and wherein if two of the neighboring block objects share a common wall with the subject block object, and if the two have a type rigid solid, and if the subject block type is non-rigid solid, then the combined visual representation defined is such that the subject block object at least extends over each common wall shared with the two neighboring block objects, and wherein a portion of a remainder of the visual representation of the subject block object is defined by a lookup table or an algorithm.

37. The method of claim 36, wherein at least one of the neighboring block objects has a type "air", and wherein at least one of the neighboring block objects has a type "rigid solid".

38. The method of claim 36, wherein each grid space represents a grid volume, each grid volume has the shape of a rectangular solid, the grid represents a three-dimensional space, and the number of neighboring block objects equals twenty-six.

39. The method of claim 36, wherein the defining a combined visual representation for the subject block object includes retrieving a combined visual representation from a lookup table, the retrieving based on the subject block object type and on the neighboring block objects and their respective types.

40. The method of claim 36, wherein the defining a combined visual representation for the subject block object includes calculating a combined visual representation using an algorithm, the algorithm including parameters based on the subject type and on the neighboring block objects and their respective types.

41. The method of claim 36, further comprising basing collision detection of the subject block object on at least the combined visual representation.

42. The method of claim 36, wherein the subject block object type is liquid, and further comprising generating a block object of type liquid in a neighboring grid space, the neighboring grid space not already occupied by a solid block object.

* * * * *